(12) United States Patent
Li et al.

(10) Patent No.: US 12,552,710 B2
(45) Date of Patent: Feb. 17, 2026

(54) METHODS OF MAKING SUSTAINABLE DUCTILE CAST CEMENTITIOUS STRUCTURE FOR CARBON DIOXIDE SEQUESTRATION

(71) Applicant: THE REGENTS OF THE UNIVERSITY OF MICHIGAN, Ann Arbor, MI (US)

(72) Inventors: Victor C. Li, Ann Arbor, MI (US); Brian R. Ellis, Ann Arbor, MI (US); Duo Zhang, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 739 days.

(21) Appl. No.: 17/631,408

(22) PCT Filed: Jul. 31, 2020

(86) PCT No.: PCT/US2020/044532
§ 371 (c)(1),
(2) Date: Jan. 28, 2022

(87) PCT Pub. No.: WO2021/022171
PCT Pub. Date: Feb. 4, 2021

(65) Prior Publication Data
US 2022/0274876 A1 Sep. 1, 2022

Related U.S. Application Data

(60) Provisional application No. 62/881,488, filed on Aug. 1, 2019.

(51) Int. Cl.
C04B 28/04 (2006.01)
B01D 53/62 (2006.01)
(Continued)

(52) U.S. Cl.
CPC .............. *C04B 28/04* (2013.01); *B01D 53/62* (2013.01); *B28B 11/243* (2013.01); *C04B 14/06* (2013.01);
(Continued)

(58) Field of Classification Search
CPC ..... C04B 28/04; C04B 14/06; C04B 16/0641; C04B 40/0236; C04B 40/0281;
(Continued)

(56) References Cited

U.S. PATENT DOCUMENTS 8,603,424 B2 12/2013 Constantz et al.
9,738,562 B2 8/2017 Monkman et al.
(Continued)

FOREIGN PATENT DOCUMENTS

WO WO-2018081310 A1 5/2018
WO WO-2021/188682 A1 9/2021

OTHER PUBLICATIONS

Duo Zhang, Yixin Shao, Early Age Carbonation Curing for Precast Reinforced Concretes, Mar. 16, 2016, Construction and Building Materials, vol. 113, p. 134-143 (Year: 2016).*

(Continued)

*Primary Examiner* — Susan D Leong
*Assistant Examiner* — Xinwen Ye
(74) *Attorney, Agent, or Firm* — Harness, Dickey & Pierce, P.L.C.

(57) ABSTRACT

Methods of preparing a cementitious structure for carbon dioxide ($CO_2$) sequestration are provided. The cementitious structure may be a cast in a mold. First, a cementitious composite material comprising binder and water is conditioned, for example, in a mold by exposing the cementitious composite material to ≥about 50% to ≤about 80% relative humidity for ≥about 3 hours to ≤about 24 hours. The cementitious composite material is then dried to remove (Continued)

≥about 10% by weight of initial water in the cementitious composite material. The cementitious structure formed is capable of a carbon dioxide uptake level of greater than or equal to about 6% by weight binder. The cementitious structure has a tensile strain capacity of ≥about 1% and a uniaxial tensile strength of ≥about 1 MPa. The method may also include carbonating the cementitious structure, following by an optional further hydration process.

9 Claims, 9 Drawing Sheets

(51) Int. Cl.
B28B 11/24 (2006.01)
C04B 14/06 (2006.01)
C04B 16/06 (2006.01)
C04B 40/02 (2006.01)

(52) U.S. Cl.
CPC ...... C04B 16/0641 (2013.01); C04B 40/0236 (2013.01); C04B 40/0281 (2013.01); B01D 2251/404 (2013.01); B01D 2257/504 (2013.01)

(58) Field of Classification Search
CPC ........... C04B 2111/1037; C04B 28/021; C04B 20/10; C04B 24/24; C04B 28/02; B01D 53/62; B01D 2251/404; B01D 2257/504; B28B 11/243
USPC .......................................... 264/DIG. 43, 297
See application file for complete search history.

(56) References Cited

U.S. PATENT DOCUMENTS

| 10,016,739 | B2 | 7/2018 | Kuppler et al. |
| 2008/0245274 | A1 | 10/2008 | Ramme |
| 2014/0322083 | A1 | 10/2014 | Kuppler et al. |
| 2017/0226021 | A1 | 8/2017 | Sant et al. |
| 2019/0256415 | A1* | 8/2019 | Jain ...................... C04B 28/021 |

OTHER PUBLICATIONS

Adedokun, David, (2014) "Optimizing Green House Carbon Dioxide Sequestration by Concrete" 10.13140/RG.2.2.33565.20967. p. 21 para 3, p. 53 para 3, p. 82 para 1.

International Search Report and Written Opinion of the ISA issued in PCT/US2020/044532, mailed Nov. 4, 2020; ISA/US, 8 pages.

Wu, Hao-Liang et al., "Development of reactive MgO-based Engineered Cementitious Composite (ECC) through accelerated carbonation curing," *Construction and Building Materials* 191(2018), pp. 23-31; (Published online Oct. 8, 2018) DOI: 10.1016/j.conbuildmat.2018.09.196.

Zhang, Duo et al., "Optimal Pre-hydration Age for $CO_2$ Sequestration through Portland Cement Carbonation," *ACS Sustainable Chem. Eng.* 2018, 6, pp. 15976-15981; (Published online: Nov. 1, 2018) DOI: 10.1021/acssuschemeng.8b03699.

American Coal Ash Association; "Fly Ash Facts for Highway Engineers"; Technical Report No. FHWA-IF-03-019; National Technical Information Service; Jun. 13, 2003; 81 pages.

* cited by examiner

US 12,552,710 B2

METHODS OF MAKING SUSTAINABLE DUCTILE CAST CEMENTITIOUS STRUCTURE FOR CARBON DIOXIDE SEQUESTRATION

CROSS-REFERENCE TO RELATED APPLICATION

This application is a 371 U.S. National Phase of International Application PCT/US2020/044532, filed on July 31, 2020, which claims the benefit of U.S. Provisional Application No. 62/881,488, filed on Aug. 1, 2019. The entire disclosures of the above applications are incorporated herein by reference.

GOVERNMENT SUPPORT

This invention was made with government support under DE-FE0030684 awarded by the U.S. Department of Energy. The government has certain rights in the invention.

FIELD

The present disclosure relates to a method of preparing a cast ductile cementitious structure for carbon dioxide sequestration.

BACKGROUND

This section provides background information related to the present disclosure which is not necessarily prior art.

Concrete is the most consumed construction material and an essential element for modern infrastructure systems. However, concrete also consumes tremendous amounts of energy and natural resources, while simultaneously generating substantial waste streams and carbon emissions through its manufacturing and life cycle. Traditional concrete material is formulated with Portland cement (PC), water, aggregate and a variety of mineral/chemical additives, and gains its binding property through various chemical reactions between the Portland cement and water, known as hydration. Manufacturing of Portland cement is carbon and energy intensive, owing to the high temperature clinkering process (e.g., clinker formation occurs at 1450° C.) needed to create appropriate hydraulic mineral components from raw ingredients, such as limestone and clay. Clinker formation accounts for approximately 5-8% of global anthropogenic carbon dioxide ($CO_2$) emissions due to fossil fuel combustion and limestone calcination. Although developments of alternative fuels and novel heating technologies have lowered emissions from fossil fuel, $CO_2$ emissions from limestone calcination are not avertable and represent about 50% of the total carbon footprint of Portland cement manufacturing. As the demand for infrastructure construction is readily increasing, it is highly desirable to seek low-carbon strategies for making concrete.

Sustainable development of modern concrete is also limited by poor concrete durability even after decades of efforts to delay its degradation and reduce required maintenance. Although a number of techniques have formed dense concrete with high strength and low permeability, concrete materials still fail to meet desired durability performance. Concrete is a brittle material with high compressive strength, but is weak in tension. Thus, traditional concrete is prone to failure in many common loading situations such as those that introduce bending moments or shear forces. For this reason, steel or other metal reinforcement is typically used to carry tension within concrete. Tensile stresses, generated from restraint deformation (e.g., thermal gradients) or mechanical loading, make concrete vulnerable to cracking. Cracks create short pathways for the ingress of detrimental species that promote material damage and structural deterioration by accelerating corrosion of reinforcing steels (e.g., rebar). Enhancing concrete durability by establishing ductility and controlling cracks is thus important for sustainable development of concrete materials having a long lifespan. It would be desirable to develop novel curing technologies to promote sustainable development, high quality products with long lifespans, and furthermore to create precast concrete products capable of sequestering significant amounts of carbon dioxide ($CO_2$).

SUMMARY

This section provides a general summary of the disclosure, and is not a comprehensive disclosure of its full scope or all of its features.

The present disclosure relates to methods of preparing a cementitious structure for carbon dioxide sequestration. In certain aspects, the cementitious structure may be a cast cementitious structure. The method may comprise conditioning a cementitious composite material comprising a binder and water in a mold by exposing the cementitious composite material to greater than or equal to about 50% relative humidity to less than or equal to about 80% relative humidity for a duration of greater than or equal to about 3 hours to less than or equal to about 24 hours. The cementitious composite material is removed from the mold. After removal from the mold, the cementitious composite material is dried to remove greater than or equal to about 10% by weight of initial water in the cementitious composite material to form the cast cementitious structure. The cast cementitious structure is capable of a carbon dioxide ($CO_2$) uptake level of greater than or equal to about 6% by weight of the binder. The cast cementitious structure has a tensile strain capacity of greater than or equal to about 1% and a uniaxial tensile strength of greater than or equal to about 1 MPa.

In one aspect, tensile strain capacity is optionally greater than or equal to about 2% and the uniaxial tensile strength of greater than or equal to about 2 MPa.

In one aspect, the conditioning occurs at ambient temperatures.

In one aspect, greater than or equal to about 10% to less than or equal to about 60% of an initial amount of water present in the cementitious composite material is removed from the cementitious composite material after the drying.

In one aspect, greater than or equal to about 15% to less than or equal to about 50% of an initial amount of water present in the cementitious composite material is removed from the cementitious composite material after the drying.

In one aspect, greater than or equal to about 20% to less than or equal to about 40% of an initial amount of water present in the cementitious composite material is removed from the cementitious composite material after the drying.

In one aspect, the binder comprises a pozzolanic material and the cementitious composite material further comprises at least one aggregate and at least one polymeric fiber.

In one aspect, the cementitious composite material is free of Portland Cement and the pozzolanic material comprises a Type C fly ash and a Type F fly ash.

In one aspect, the binder comprises Portland cement and has a carbon dioxide uptake level of greater than or equal to about 30% by weight of the Portland cement.

In one aspect, the method further comprises carbonating the cementitious composite material after the drying.

In one aspect, the method further comprises exposing the cast cementitious structure to water for rehydration after the carbonating.

In one further aspect, the drying is conducted for greater than or equal to about 2 hours to less than or equal to 6 hours.

In certain other aspects, the present disclosure relates to methods of preparing a cementitious structure for carbon dioxide sequestration that comprise conditioning a cementitious composite material comprising Portland cement and water. The method comprises exposing the cementitious composite material to greater than or equal to about 50% relative humidity to less than or equal to about 80% relative humidity for a duration of greater than or equal to about 16 hours to less than or equal to about 24 hours. The cementitious composite material is dried to remove greater than or equal to about 20% by weight of initial water in the cementitious composite material to form the cementitious structure capable of a carbon dioxide ($CO_2$) uptake level of greater than or equal to about 25% by weight Portland cement. The cementitious structure has a tensile strain capacity of greater than or equal to about 1% and a uniaxial tensile strength of greater than or equal to about 1 MPa.

In one aspect, the conditioning occurs at ambient temperatures.

In one aspect, greater than or equal to about 20% to less than or equal to about 40% of an initial amount of water present in the cementitious composite material is removed from the cementitious composite material after the drying.

In one aspect, the cementitious composite material further comprises at least one aggregate and at least one polymeric fiber.

In one aspect, the carbon dioxide ($CO_2$) uptake level is greater than or equal to about 35% by weight Portland cement.

In one aspect, the method further comprises carbonating the cementitious composite material after the drying.

In yet other aspects, the present disclosure relates to methods of preparing a cementitious structure for carbon dioxide sequestration that comprises conditioning a cementitious composite material comprising a binder and water. The cementitious composite material is exposed to greater than or equal to about 50% relative humidity to less than or equal to about 80% relative humidity for a duration of greater than or equal to about 3 hours to less than or equal to about 4 hours. The binder comprises a Type C fly ash and a Type F fly ash and the cementitious composite material is free of Portland cement. The cementitious composite material is dried to remove at least greater than or equal to about 20% by weight of initial water in the cementitious composite material to form the cementitious structure capable of a carbon dioxide ($CO_2$) uptake level of greater than or equal to about 6% by weight binder. The cementitious structure has a tensile strain capacity of greater than or equal to about 1% and a uniaxial tensile strength of greater than or equal to about 1 MPa.

In one aspect, the method further comprises carbonating the cementitious structure after the drying.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 describes an illustrative method for $CO_2$ sequestration in ductile cementitious composite materials according to certain aspects of the present disclosure;

FIG. 2 is an illustration showing the dimensions and apparatus of a dogbone-shaped specimen for uniaxial tension test;

FIG. 3 describes a four-step laboratory-scale process for sequestering $CO_2$ in Portland cement (PC)-based ductile composite in accordance with certain aspects of the present disclosure;

Figure 8:
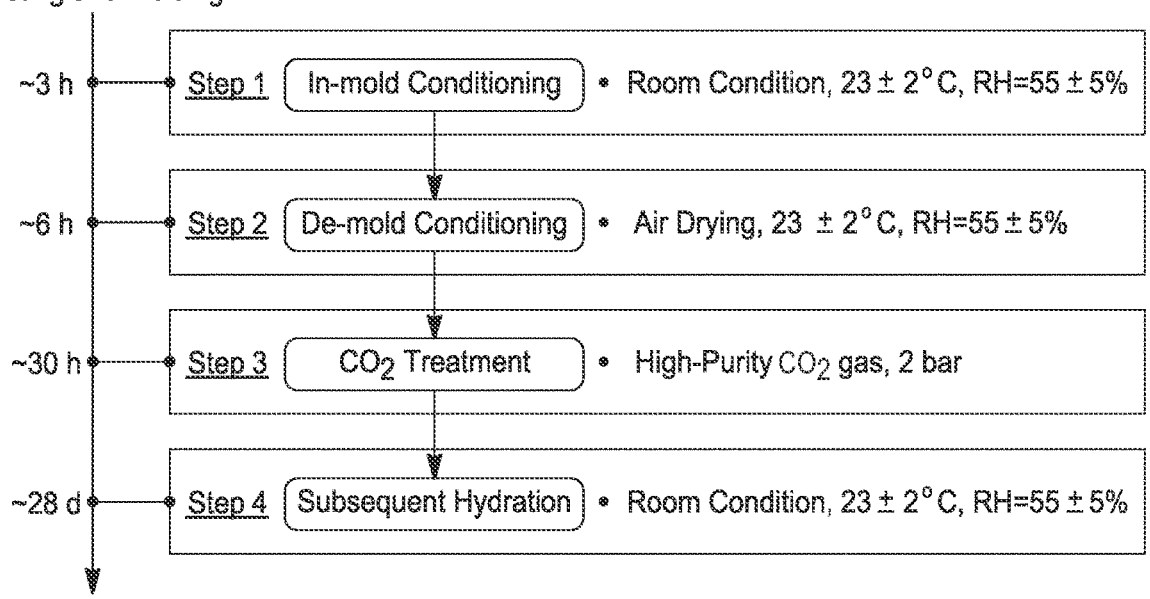
Figure 9A:
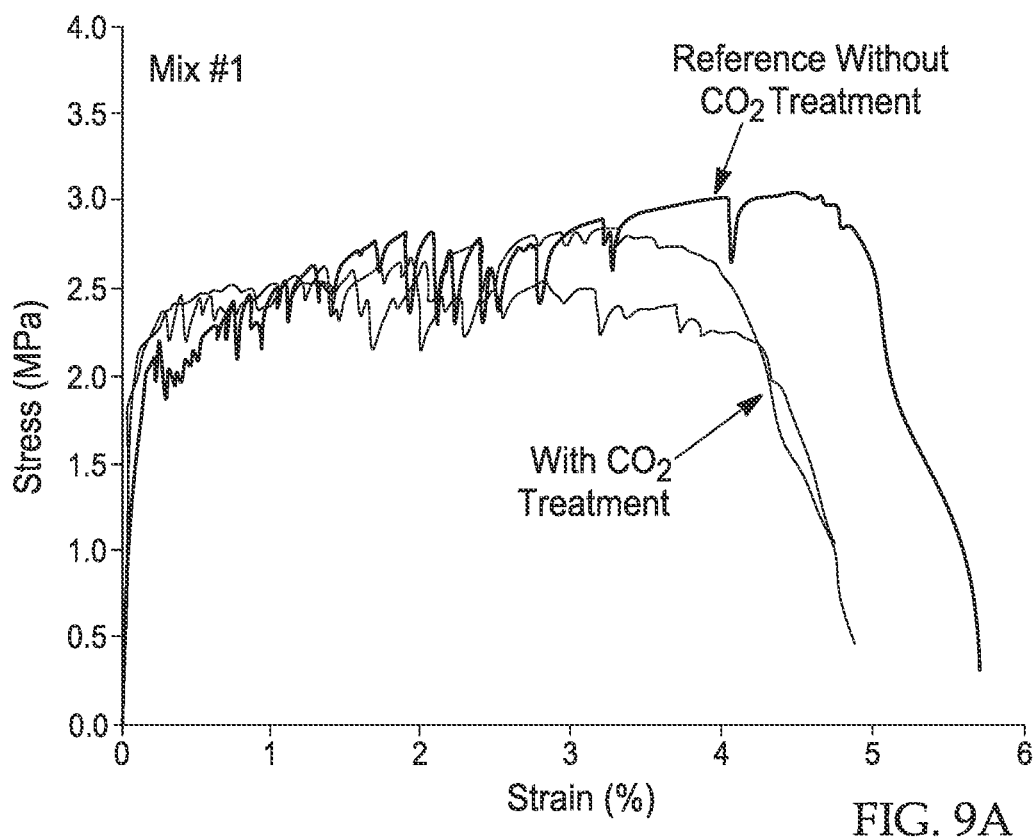
Figure 9B:
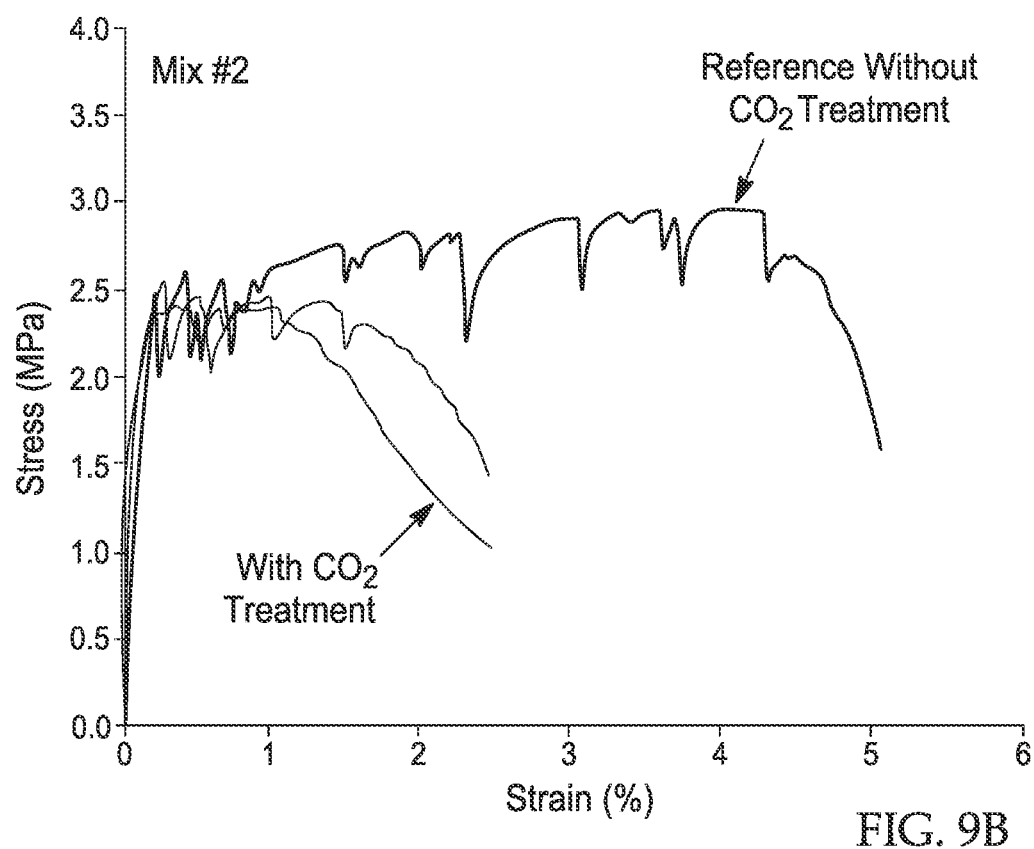
Figure 9C:
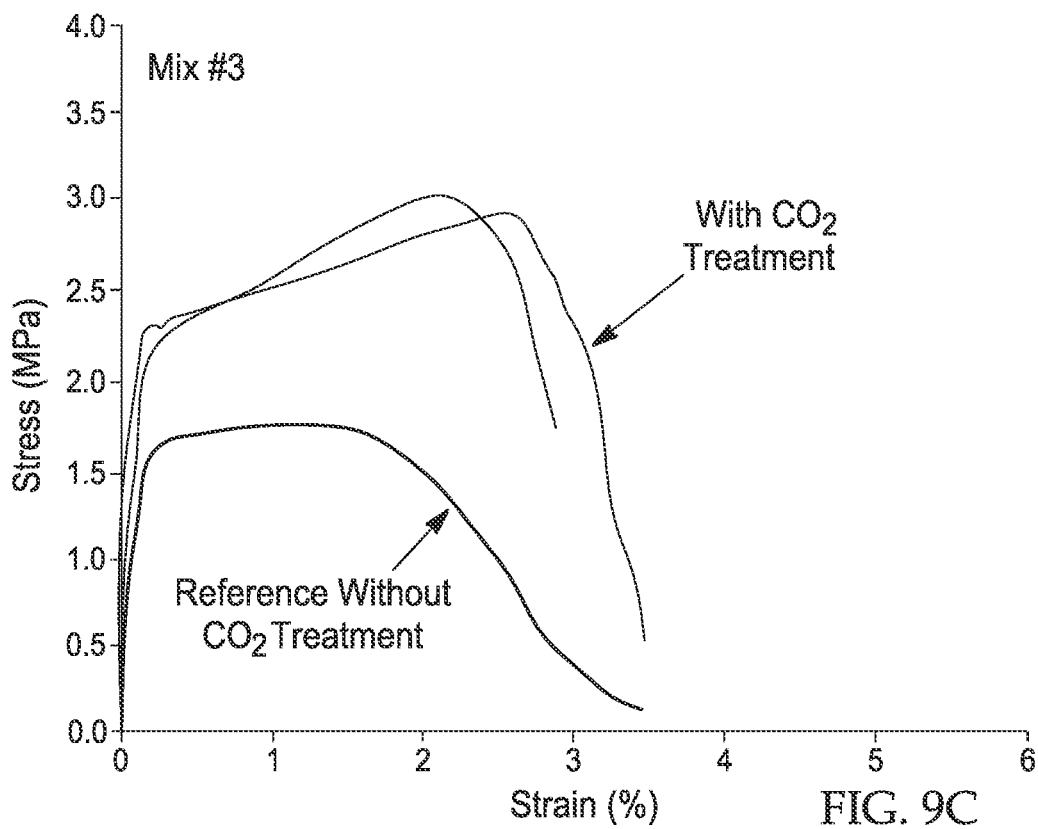
Figure 9D:
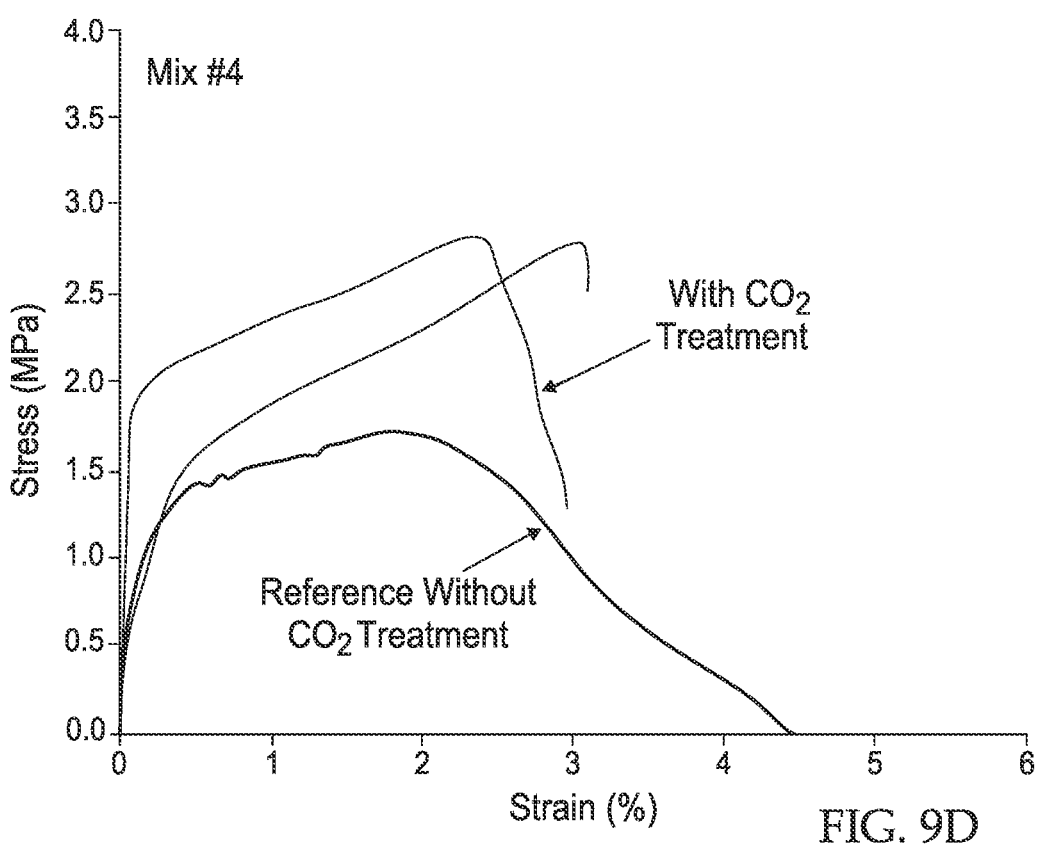

FIGS. 7A-7D show uniaxial tension test results (stress-strain curves) with the 24-hour $CO_2$ treatment prepared in accordance with certain aspects of the present disclosure. More specifically, uniaxial tensile stress-strain curves of PC-based ductile composites at 28 days are shown for: (FIG. 7A) 1% volume Polypropylene beads in the cementitious composite material, (FIG. 7B) surface-modified fibers in the cementitious composite material, (FIG. 7C) high volume siliceous ash in the cementitious composite material, and (FIG. 7D) 10% MgO mineral additive in the cementitious composite material;

FIG. 8 describes a four-step laboratory-scale process for sequestering $CO_2$ in PC-free ductile composite prepared in accordance with certain aspects of the present disclosure; and FIGS. 9A-9D are uniaxial tensile stress-strain curves of PC-free ductile composites made in accordance with certain aspects of the present disclosure where FIG. 9A shows a first cementitious composite material (Mix #1), FIG. 9B shows a second cementitious composite material (Mix #2), FIG. 9C shows a third cementitious composite material (Mix #3), and FIG. 9D shows a fourth cementitious composite material (Mix #4).

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, unless otherwise indicated, amounts expressed in weight and mass are used interchangeably, but should be understood to reflect a mass of a given component.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

As discussed above, concrete that incorporates Portland cement is widely used in modern infrastructure systems. However, traditional Portland cement manufacturing is energy and natural resource intensive, generating large volumes of waste and emissions, including carbon emissions. Precast manufacturing is a downstream industry of modern concrete materials. Generally, the precast industry requires fast production turn-over to ensure manufacturing efficiency and construction speed. Portland cement hydration, however, is a kinetically controlled chemical reaction, which delays early strength development and limits manufacturing efficiency requiring longer casting times for precast materials. The process for concrete early strength development, referred to as the "curing" process, also plays an important role in material quality and structural durability performance. Typical curing approaches that use external heat and high moisture to expedite the concrete curing process (known as steam/autoclave curing) tend to coarsen concrete pore structure and lead to chemical changes that may cause material swelling and cracking. The high temperature and relative humidity (e.g., at or near 100%) also incur secondary cost and carbon emissions by consuming additional fuel. Thus, it would be desirable to develop novel curing technologies to promote sustainable development of the precast industry.

$CO_2$ sequestration in construction materials has gained increasing attention in recent decades due to the safe storage of $CO_2$ emissions and large storage potential. In conventional concrete, Portland cement-based systems have typically demonstrated capability of chemically trapping $CO_2$, typically less than 20 weight % (e.g., about 5-20 weight %). This process, also known as carbonation, can promote chemical stability and enhance material durability when exposed to a variety of aggressive environments. Nevertheless, the alkaline environment created by Portland cement hydration is neutralized during the carbonation process, which substantially raises the risk of corrosion for conventional reinforced concrete.

The present disclosure provides a new carbon dioxide ($CO_2$) sequestration technology that integrates ductile cementitious formulations with tailorable $CO_2$ capture processes. Such methods are particularly suitable for forming precast structures or for use in coal powered facilities, where waste coal ashes and waste $CO_2$ from coal combustion can be transformed to a ductile and durable precast building product through a new curing process in accordance with certain aspects of the present disclosure. The high material ductility potentially eliminates the needs for steel reinforcement, hence further extending structural service life by eliminating corrosion-induced deteriorations. The low-carbon ingredients, high $CO_2$ storage capability and enhanced material durability collectively serve to create a more efficient, durable and sustainable concrete infrastructure system.

First, a fresh composite mixture is formed from the various ingredients of the cementitious composite material. This fresh cementitious composite material is cast and molded. Two conditioning steps are conducted for pre-carbonation treatment in accordance with various aspects of the present disclosure, including an in-mold conditioning process and a de-molded conditioning process. The purpose of these two steps is to optimize $CO_2$ sequestration efficiency at the minimal expense of energy consumption.

Figure 1:
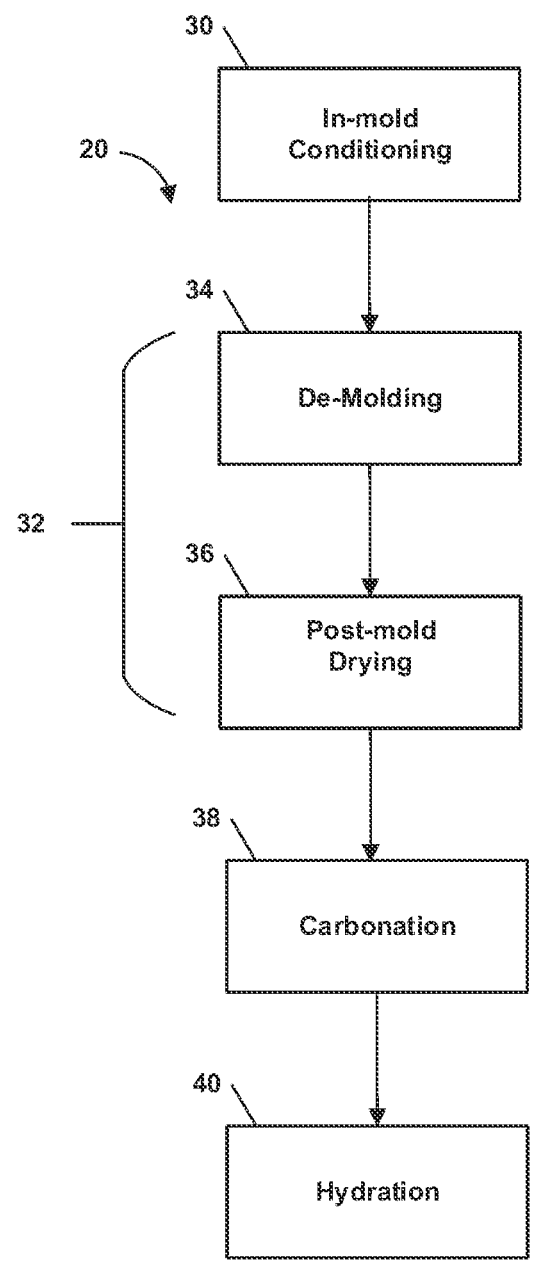

In certain aspects, the present disclosure provides a method 20 of preparing a cast cementitious structure for carbon dioxide sequestration, as shown in FIG. 1. The method 20 may comprise a first conditioning process 30 of a cementitious composite material while it is in a mold. The mold may have a predetermined shape that will form the cast cementitious structure after being filled with the cementitious composite material. The mold may be a typical concrete formwork. The cementitious composite material comprises water, among other components, as will be described further below. The first conditioning process 30 includes hydrating the cementitious composite material while in the mold by exposing it to a surrounding atmosphere that is controlled for relative humidity. For example, the controlled atmosphere may have a relative humidity ranging from greater than or equal to about 50% relative humidity and less than or equal to about 80% relative humidity (where relative humidity is a ratio of a partial pressure of water vapor to vapor pressure of water at a predetermined temperature and pressure). In certain variations, a relative humidity level is greater than or equal to about 50% to less than or equal to about 60% relative humidity, for example, about 55% relative humidity.

In certain aspects, the first conditioning process 30 or in-mold conditioning can be conducted at ambient conditions. The length of in-mold conditioning is generally controlled by the setting time of the cementitious composite material and may vary with different composite mixtures, as discussed below. The length of in-mold conditioning can also be tailored by cementitious composite material formulation changes or introducing chemical accelerator/retarder into the cementitious composite material. In certain aspects, the first conditioning process 30 may be conducted for greater than or equal to about 6 hours to less than or equal to 24 hours, for example, greater than or equal to about 16 hours to less than or equal to 20 hours, and in certain variations, about 18 hours.

Thus, following the in-mold first conditioning process 30, a second conditioning process 32 is conducted. The second conditioning process 32 includes a demolding step 34, where the cementitious composite material is removed from the mold. Once demolded, the second conditioning process 32 includes a post-mold drying process 36, where the composite material is dried (de-mold conditioning) to partially remove at least a portion of the water (free water) in the cementitious composite material. This post-mold drying process 36 can be realized by forced wind drying (e.g., forced air drying) or air drying depending on the water content and the processing time window. The extent of water removal in the post-mold drying process 36 can be used to tailor $CO_2$ sequestration capacity. Pore water present within the cementitious composite material impedes diffusion path of $CO_2$ gas and hinders the $CO_2$ uptake process. In other words, the dehydration process is conducted in a manner that free water is removed to create open diffusion pathways within the cementitious composite material to permit influx of $CO_2$, while minimizing or avoiding loss of bound water within the cementitious composite material. In certain aspects, the post-mold drying process 36 may be conducted for greater than or equal to about 2 hours to less than or equal to 6 hours, for example, about 4 hours.

As will be described in greater detail below, a rate of water removal during the post-mold drying process 36 is controlled to enhance the cast material's subsequent ability to sequester carbon dioxide. After the post-mold drying process 36, greater than or equal to about 10% to less than or equal to about 60% by mass or weight of an initial amount of water present is removed from the cementitious composite material, optionally greater than or equal to about 15% to less than or equal to about 50% by weight; or greater than or equal to about 20% to less than or equal to about 40% by weight of an initial amount of water present is removed from the cementitious composite material.

The total duration of the first conditioning process 30 and second conditioning process 32 can correspond to the pre-carbonation hydration age of the cementitious composite material, which may affect long-term mechanical properties of the Portland cement-based ductile composites. In certain aspects, a total duration of the first conditioning process 30 and second conditioning process 32 can be greater than or equal to about 8 hours to less than or equal to 30 hours, for example, greater than or equal to about 18 hours to less than or equal to 26 hours, and in certain variations, about 22 hours.

After the post-mold drying process 36 in the second conditioning process 32 is finished, the cast cementitious structure is formed. Thus, the cementitious composite material hydrates in a controlled atmosphere during the in-mold conditioning step in the first conditioning process 30, which is followed by the second conditioning process 32. Thus, after demolding step 34, the cementitious composite material is further processed by the post-mold drying process 36, where the cementitious composite material is dehydrated in a controlled manner, so that the cast cementitious structure is capable of sequestering relatively large amounts of carbon dioxide. For example, in certain variations, after conducting the first conditioning process 30 and second conditioning process 32, the cast cementitious structure is capable of a carbon dioxide uptake level of greater than or equal to about 6% by weight of binder (e.g., Portland cement) in the cementitious structure, optionally greater than or equal to about 7%, optionally greater than or equal to about 8%, optionally greater than or equal to about 9%, optionally greater than or equal to about 10%, optionally greater than or equal to about 15%, optionally greater than or equal to about 20%, optionally greater than or equal to about 25%, optionally greater than or equal to about 30%, optionally greater than or equal to about 34%, optionally greater than or equal to about 35%, and in certain variations, optionally greater than or equal to about 36% by weight of the binder. In certain aspects, the conditioned cast cementitious structure is capable of taking up carbon dioxide at greater than or equal to about 6% by weight to about 36% by weight of binder.

Thus, following the first conditioning process 30, followed by the second conditioning process 32 that includes removing the cementitious composite material from the mold in demolding step 34 followed by the post-mold drying process 36 where the cementitious composite material is dried at a controlled rate, the cementitious structure formed is capable of sequestering relatively large amounts of carbon dioxide is formed. The method may further comprise a carbonation process 38, where the cementitious structure is exposed to a source of carbon dioxide that reacts with and/or is bound to the cementitious structure. The carbonation process 38 may also be considered to be a curing process for the cementitious composite material to facilitate various chemical reactions therein. In certain variations, the carbon dioxide may be a concentrated source of carbon dioxide. For example, the cementitious composite structure may be transferred to a pressures vessel, in which $CO_2$ gas is subsequently injected. The $CO_2$ source can be high-purity $CO_2$ gas (≥98%) or waste industrial gas containing low-purity $CO_2$ (e.g., coal combustion flue gas). The gas pressures may be in the range of greater than or equal to about 1 bar to less than or equal to about 5 bars. Parameters that can be tailored during the carbonation process include duration of carbonation, gas pressure and/or temperature.

After the $CO_2$ treatment in the carbonation process 38, an optional hydration process 40 or water compensation step may occur, where water is introduced to the ductile carbonated cementitious composites structures to promote subsequent hydration of the unreacted binder components. Thus, the ductile carbonated cementitious composites structural components may be exposed to water. For example, water spray or immersion in a water bath can be used on the cast cementitious structural component. The length of this hydration process 40 (e.g., water compensation process) may take up to 28 days. In one variation, the hydration process 40 may be conducted at ambient conditions (for example at greater than or equal to about 21° C. to less than or equal to about 25° C., optionally about 23° C. and at a relative humidity level of greater than or equal to about 50% to less than or equal to about 60% relative humidity, for example, about 55% relative humidity.

In this manner, following carbonation 38, development of tensile strength and ductility can be accelerated when the optional hydration process step 40 is conducted.

The method 20 of preparing a cast cementitious structure for carbon dioxide sequestration may include conducting each of the steps sequentially and directly one after the other, for example, the first conditioning process 30, followed immediately by the second conditioning process 32, then the carbonation process 38, and finally the hydration process 40. After subjecting the cast cementitious structural component to the method 20, it may be stored and/or transported and placed where it will be used to form a concrete structure, for example, as infrastructure in an outdoor location.

In certain variations, the cementitious composite material comprises water and a binder. The binder may comprise Portland cement. In other variations, the cementitious composite material comprises a binder comprising fly ash. For example, in one variation, the cementitious composite material comprises water and a binder comprising Portland cement and Class F fly ash. In certain other variations, the binder comprises fly ash, such as a Class C fly ash and a Class F fly ash, but the cementitious composite material is free of any Portland cement.

In certain aspects, the cementitious compositions may be considered to be an engineered cementitious composite (ECC). ECCs are a type of high-performance fiber-reinforced cementitious composites (HPFRCC) with significant strain-hardening behavior under tension. The broad ECC family of cementitious materials is compatible with typical concrete processing methods (e.g., pouring into molds or forms/formwork, spraying, and the like). Many ECCs have the ability to reach tensile strain capacities of about 3 to 5% under loading, as compared with 0.01 to 0.02% for traditional concrete, while maintaining tight crack widths of less than or equal to about 100 and in certain variations, less than or equal to about 50 μm. These tight crack widths are an intrinsic material property of the ECC and do not depend on the amount of steel reinforcement or the size of a structure. Further, due to the high ductility of ECCs, an ECC slab can undergo extensive bending without fracture, similar to the behavior of a ductile metal.

Moreover, ECCs can exhibit self-healing properties, where a combination of intrinsic reactions form healing products, which fill and bind the faces of the microcracks of ECC when damage occurs. The continued hydration of unreacted cement, pozzolanic reactions, and carbonation produce calcium silicate hydrates (C—S—H) and calcium carbonate ($CaCO_3$), which have been found to be the two main healing products formed in ECC. It has been shown that the extent of self-healing is highly dependent on the crack width of a concrete material, with smaller cracks heal more completely and at a faster rate than larger cracks. Therefore, the tight crack widths of ECC promote robust self-healing behavior, which allows the damaged material to regain both permeability and mechanical properties. ECC materials can undergo self-repair in the presence of water (for example, relative humidity or precipitation) and oxygen (e.g., air), making self-healing ECC feasible for outdoor infrastructure applications.

ECCs generally comprise a binder, such as one or more pozzolanic materials, one or more polymeric fibers, one or more aggregates, and water, among other possible components. The micromechanics of ECCs have been previously described, and differ from those of other fiber-reinforced concretes. In short, when brittle cementitious matrix fractures are in tension in ECCs, the dispersed polymeric fibers are able to bridge the crack, holding the crack to several tens of microns in width, while carrying the tensile load such that further opening of the microcrack requires more energy than originating a microcrack elsewhere in the matrix. As this cycle is repeatable, the composite is able to distribute deformation throughout and suppress brittle fracture failure. Thus, ECCs are more damage and flaw tolerant than other fiber-reinforced materials due to strain-hardening behavior occurring, rather than strain-softening behavior. ECCs exhibit tensile ductility (strain capacity prior to failure, where failure is defined as the inability to carry and increasing load) and toughness (energy required to cause failure) hundreds of times those values of traditional concretes, providing the potential to eliminate or diminish the amount of steel reinforcement necessary to accommodate tensile loading. In certain aspects, the structural components formed of a cementitious composite material prepared in accordance with the present teachings are free of reinforcement metal structures, such as steel reinforcements (e.g., rebar) that are traditionally used in concrete for withstanding tensile loads. Cementitious composite compositions can be used that exhibit the characteristic strain-hardening behavior of ECCs, but are also treated in accordance with the present disclosure to be conditioned for enhanced carbon dioxide sequestration.

In various aspects, cementitious composite materials are selected that are ductile formulations and can be chosen based on the need for composite mechanical performance and potentials of $CO_2$ sequestration. In Portland cement (PC)-based ductile cementitious composite materials prepared in accordance with certain aspects of the present disclosure, Portland cement is the main contributor to $CO_2$ sequestration, whereas the carbonation reactivity of the Portland cement-free ductile composite prepared in accordance with other aspects of the present disclosure is attributed to a calcareous coal ash, as will be described further below. $CO_2$ uptake in the raw materials can be estimated by mass change and thermal gravimetric analysis (TGA).

As the starting material, in certain variations, the formulated composites demonstrate tensile ductility prior to $CO_2$ carbonation. In general, there is no strict limit posed on the minimal strain capacity to be achieved by the composite before $CO_2$ sequestration. However, the strain capacities of ductile cementitious composites provided by certain aspects of the present disclosure exceed 1% without $CO_2$ sequestration by tailoring material formulations.

In one aspect, the carbonated cementitious composition has a quasi-static (low strain rate) uniaxial tensile strength of greater than or equal to about 1 MPa, optionally greater than or equal to about 1.5 MPa, optionally greater than or equal to about 2 MPa, and in certain aspects, greater than or equal to about 2.5 MPa. Tensile testing is performed with a universal tensile testing machine (Instron), with constant displacement loading at a rate of 0.008 mm/s, based on the recommendations of the Japan Society of Civil Engineers, "Recommendations for Design and Construction of High Performance Fiber Reinforced Cement Composites with Multiple Fine Cracks (HPFRCC)," Concrete Engineering Series 82 (March 2008), the relevant portions of which are incorporated herein by reference. Ultimate tensile strength is reported as the stress at the maximum load sustained by each composite. In one aspect, the uniaxial tensile strength is greater than or equal to about 2.5 MPa to less than or equal to about 15 MPa and optionally greater than or equal to about 2.5 MPa to less than or equal to about 7 MPa.

In another aspect, the hardened carbonated cementitious composition has a tensile strain capacity of greater than or equal to about 1% as measured by a uniaxial tension conducted in a test described above in the context of the uniaxial tensile strength. Strain capacity is reported as the strain at maximum stress carried by the composite prior to terminal stress decay. In certain aspects, the tensile strain capacity is greater than or equal to about 1%, optionally greater than or equal to about 2%, optionally greater than or equal to about 3%, and in certain aspects greater than or equal to about 4%. In certain aspects, the tensile strain capacity is greater than or equal to about 1% to less than or equal to about 6%, and optionally greater than or equal to about 2% to less than or equal to about 4.5%.

In certain aspects, the carbonated cementitious composition of the present disclosure exhibits a compressive strength at 48 hours after initial hydration is greater than or equal to about 20 MPa. The hardened composite sample is aged for 100 hours and then subjected to compression testing performed with a Forney™ compression machine. A loading rate of approximately 50 psi/s is used, based on recommendations of the ASTM C109 International standard. Compressive strength is reported as the stress at the maximum load sustained by the composite. In certain variations, the compressive strength at 48 hours is greater than or equal to about 20 MPa to less than or equal to about 50 MPa.

In yet other aspects, the carbonated cementitious composition has a compressive strength measured at 28 days from initial hydration of greater than or equal to about 25 MPa. Thus, the sample is aged for 28 days and subjected to a compression test as described above in the context of the 48 hour compressive strength test. In certain variations, the compressive strength at 28 days is greater than or equal to about 25 MPa to less than or equal to about 60 MPa, optionally greater than or equal to about 30 MPa to less than or equal to about 50 MPa and optionally greater than or equal to about 35 MPa to less than or equal to about 40 MPa. In one variation, the 28 day compressive strength is about 49 MPa.

In certain other aspects, the carbonated cementitious composition at 28 days has a flexural strength or modulus of rupture of greater than or equal to about 5 MPa to less than or equal to about 10 MPa.

In various aspects, the carbonated cementitious compositions provided herein allow strain-hardening and distributed microcracking behavior in cementitious materials. In certain variations, the carbonated ECC cementitious composition comprises a binder or pozzolanic material, such as Portland cement or fly ash, at least one aggregate, such as a silica sand, at least one polymeric fiber, and water. In certain variations, the cementitious composite material also comprises additional components, such as superplasticizers and high range water reducing agents.

One type of suitable pozzolanic material is Portland cement. Portland cement typically comprises inorganic compounds, such as dicalcium silicate ($C_2S$ or $2CaO \cdot SiO_2$), tricalcium silicate ($C_3S$ or $3CaO \cdot SiO_2$), tricalcium aluminate ($C_3A$ or $3CaO \cdot Al_2O_3$), and tetracalcium aluminoferrite ($C_4AF$ or $4CaO \cdot Al_2O_3 \cdot Fe_2O_3$), which may be hydrated. Commercially available Portland cement often includes additives, such as gypsum (calcium sulfate) that serves as a set retardant, and pozzolans, like fly ash and ground granulated blast furnace slags (GGBFS), that can react with calcium hydroxide and water to form calcium silicate hydrates or calcium aluminate hydrates. When other pozzolans are added to Portland cement, they are considered to be blended cements. ASTM, International Test C 150 called the "Standard Specification for Portland Cement" provides eight types of ordinary Portland cement for different applications, namely: Types I, IA, II, IIA, III, IIIA, IV, and V. In certain non-limiting aspects, the Portland cement used in the cementitious composition may be Type I.

The Portland cement may be present in the cementitious composite material at greater than or equal to about 0 mass or weight % to less than or equal to about 45 weight % of the total cementitious binders present in the cementitious composition, optionally at greater than or equal to about 0 weight % to less than or equal to about 30 weight % of the total mass of the total composite composition. In certain variations, the Portland cement is present at greater than or equal to about 15 weight % to less than or equal to about 45% by weight in the cementitious composite material, optionally greater than or equal to about 30 weight % to less than or equal to about 45% by weight in the cementitious composite material, and in certain variations, the Portland cement is present at greater than or equal to about 32 mass % to less than or equal to about 36% by weight in the cementitious composite material. In one embodiment, Portland cement is present in the composition at about 35 weight % of the total, overall cementitious composite material.

Fly ash can be added to the cementitious composite material and serves as a pozzolan/cementitious material. Fly ash is a calcareous industrial byproduct, for example, collected from effluent of a coal burning boiler unit. It can be used as a substitute for a portion of or all of the Portland cement used in the cementitious composite material to reduce energy consumption required to form the overall product and increase the environmental friendliness of the cementitious composition. Fly ash contributes to the cementitious properties of the matrix/binder system of the concrete composite.

In one variation, the fly ash may be a Class F fly ash or Class C fly ash as designated by ASTM C618-19, which may be formed from combustion of coals. ASTM C618 requires that Class F and Class C fly ashes contain at least 50% pozzolanic compounds (silica oxide, alumina oxide, and iron oxide). Class F fly ash may be formed from combustion of anthracite and/or bituminous coals, while Class C fly ash may typically be formed from combustion of lignite or subbituminous coal. Class F fly ash has less than about 18% maximum of calcium oxide (CaO), while Class C has greater than or equal to 18% calcium oxide (CaO). Class F fly ash has pozzolanic properties. Class C fly ash has pozzolanic properties, as well as some cementitious properties. Table 1 has typical chemical compositions of Class C #1 fly ash, Class C #2 fly ash, and Class F fly ash and estimated carbon dioxide uptake levels.

TABLE 1

Chemical compositions of fly ashes

| Component | Class C #1 | Class C #2 | Class F |
|---|---|---|---|
| CaO | 28.0 | 27.6 | 3.4 |
| $SiO_2$ | 33.0 | 32.8 | 52.3 |
| $Al_2O_3$ | 19.5 | 19.1 | 22.2 |
| $Fe_2O_3$ | 5.9 | 6.7 | 13.5 |
| $SO_3$ | 2.8 | 2.1 | 2.2 |
| MgO | 4.1 | 4.7 | 0.9 |
| $K_2O$ | 0.6 | 0.7 | 2.6 |
| $TiO_2$ | 1.6 | 1.3 | 1.0 |
| MnO | — | — | — |
| $P_2O_5$ | 1.2 | 1.5 | 0.1 |
| $CO_2$ uptake | 7.1% | 5.2% | 0% |

In certain variations, the cementitious composite material may comprise a binder that includes both Portland cement and a fly ash, such as a Class F fly ash. The total amount of Class F fly ash may be present in the cementitious composition at greater than or equal to about 0 mass or weight % to less than or equal to about 45 mass % of the total mass of cementitious composite material, optionally at greater than or equal to about 0 mass % to less than or equal to about 35 mass % of the total mass of cementitious composite material; optionally at greater than or equal to about 0 mass % to less than or equal to about 25 mass % of the total cementitious composite material, and in certain aspects, optionally at greater than or equal to about 10 mass % to less than or equal to about 25 mass % of the total cementitious composite material.

In certain variations, the cementitious composite material may be free of Portland cement. For example, PC-free ductile cementitious composite materials may include two types of fly ashes as the binder. In such variations, the binder of the cementitious composite material may comprise a Class C fly ash. As the Class C fly ash may be used to replace the Portland cement, it may be used at the same concentrations as those described above in the context of the Portland cement. The binder may also comprise a Class F fly ash. For example, a Class C #1 fly ash can be used as the binding phase, and Class F fly ash for tailoring tensile ductility. In another embodiment, Class C #2 fly ash can be used as the binding phase, and Class F fly ash for tailoring tensile ductility. Thus, Class C #1 and Class C #2 fly ashes can be used in combination with one another or individually and may be combined with Class F fly ash to formulate cementitious composite material according to the present disclosure.

In certain alternative variations, the binder in the cementitious composite material may also comprise other pozzolans or cements, such as calcium aluminate cement.

The cementitious composition also includes an aggregate. Aggregates can be divided into different grades, for example, fine aggregate and course aggregate. Course aggregates include particles generally retained on the a 4.75 mm sieve (No. 4 sieve), but that pass through 75 mm (3 inch) sieve. In certain variations, the cementitious composite material comprises a fine aggregate, such as an inert sand or inert finely crushed stone. Fine aggregates have a particle size distribution having approximately 95% passing on a 9.5 mm sieve (⅜ inch sieve). In certain variations, the fine aggregate is sand. The solid aggregate is distributed within the cementitious matrix to form a cementitious composite material. In certain variations, the aggregate may be substantially homogeneously distributed within the cementitious composite material (e.g., concrete) that is formed. The fine aggregate may comprise sand that has an average particle size of less than or equal to about 2 mm. In one non-limiting variation, the aggregate may be an F-75 silica or quartz sand commercially available from U.S. Silica. The aggregate, such as fine aggregate like sand, may be present in the cementitious composite material at greater than or equal to about 10 mass % to less than or equal to about 35 mass % of the total composition, optionally greater than or equal to about 10 mass % to less than or equal to about 25 mass % of the total composition.

In other aspects, the cementitious composition comprises at least one type of polymeric fiber distributed within the cementitious matrix to form a cementitious composite material (in combination with the aggregate solid material). In certain variations, the plurality of polymer fibers may be substantially homogeneously distributed within the cementitious composite material (e.g., concrete) that is formed. The polymer fibers may have a single composition or may include a mixture of different compositions or other combinations of select properties, such as different lengths or diameters. The polymer fibers may include a variety of distinct polymers; however, in certain variations, the fibers may comprise polyvinyl alcohol (PVA) or polyalkylene fibers, such as polyethylene (PE) or polypropylene (PP), including high tenacity polypropylene (HTPP) fibers. In other aspects, the polymer fibers may be natural polymer fibers, such as sisal, jute, curaua fibers, and/or cellulose-based fibers. In certain variations, the polymeric fibers may be oil coated. The oil coating may be greater than or equal to about 1 to less than or equal to about 1.5% by mass, for example, about 1.2% by mass, of the total mass/weight of the fiber and oil coating combined.

The polymer fiber may have an aspect ratio (AR) or ratio between a length of the fiber (L) and a diameter (D) of the fiber (AR=L/D) of greater than or equal to about 150. In certain variations, the AR may be greater than or equal to about 150 to less than or equal to about 900. For PVA fibers, an exemplary AR may be about 300, while for polypropylene fibers, an exemplary AR may be about 800.

In certain variations, a polymer fiber used in the cementitious composite material may have a length of greater than or equal to about 4 mm to less than or equal to about 20 mm, optionally greater than or equal to about 6 mm to less than or equal to about 15 mm, optionally greater than or equal to about 8 mm to less than or equal to about 12 mm, and in certain variations, optionally greater than or equal to about 8 mm to less than or equal to about 10 mm. In certain variations, a polymer fiber used in the cementitious composition has a diameter of greater than or equal to about 10 micrometers ($\mu m$) to less than or equal to about 200 $\mu m$. In one variation, the polymeric fiber is a PVA fiber that may have a length of about 12 mm and a diameter of about 40 micrometers. In another variation, the polymeric fiber is a PP fiber that may have a length of about 12 mm and a diameter of about 12 micrometers. The polymer fiber may be present in the cementitious composition at greater than or equal to about 1 vol. % to less than or equal to about 4.5 vol. % of the total volume of the cementitious composition, optionally at greater than or equal to about 1.8 vol. % to less than or equal to about 4 vol. %, and in certain variations, optionally at about 2 vol. %. In certain compositions, 2 vol. % is about 2.9 mass/weight %.

Water is also included in the cementitious composition. A mass ratio of water to cementitious binder components (e.g., Portland cement, calcium aluminate cement, and pozzolanic materials, like fly ash) may be greater than or equal to about 0.2 to less than or equal to about 0.3. In one variation, a mass ratio of water to cementitious binder components is about 0.27. Water may be present in the cementitious composition at greater than or equal to about 10 mass % to less than or equal to about 20 mass % of the total composite. In one variation, the water may be present at about 16% by mass of the total composition.

In certain variations, the cementitious composite material further comprises one or more components selected from the group consisting of: microsilica, silica flour, a cellulose-based additive, a superplasticizer or high range water reducing agent (HRWR), and combinations thereof.

Microsilica (MS) can be substituted for silica sand by weight. Microsilica generally has an average particle size of greater than or equal to about 50 nm to less than or equal to about 200 $\mu m$. In one variation, an average particle size of the microsilica is greater than or equal to about 50 nm to less than or equal to about 200 nm, for example, a mean particle size may be about 150 nm (less than 0.1% of primary particles have a particle size of greater than 450 nm). A suitable microsilica is Elkem Microsilica® 955, which is commercially available from Elkem. The microsilica may be present at greater than or equal to about 0 mass % to less than or equal to about 5 mass % of the total cementitious composite material Ground silica, also called silica flour, may be added to the cementitious composition and generally has a particle size of greater than or equal to about 40 $\mu m$ to less than or equal to about 300 $\mu m$. A suitable ground silica/silica flour is U.S. Silica brand Sil-Co-Sil™ 75 (crystalline quartz). The ground silica may be present in the cementitious composite material at greater than or equal to about 0 mass % to less than or equal to about 10 mass % of the total cementitious composite material; optionally at greater than or equal to about 0 mass % to less than or equal to about 5 mass % of the total cementitious composite material.

In various aspects, the total cumulative amount of aggregate in the cementitious composition, including any fine aggregate like sand, microsilica, and ground silica may be greater than or equal to about 15 mass % to less than or equal to about 60 mass % of the total cementitious composite material.

In yet other aspects, the cementitious composition includes a cellulose-based additive, such as hydroxypropylmethyl cellulose (HPMC). The cellulose-based additive may be present at greater than or equal to about 0 mass % to less than or equal to about 0.6 mass % of the total cementitious composite material.

In certain variations, the cementitious composite material may comprise Portland cement. The cementitious composite material may also comprise fly ash. In certain variations, the Portland cement is present at greater than or equal to about 15 mass % to less than or equal to about 30 mass % of the total mass of the cementitious composite material composition, fly ash is present at greater than or equal to about 30 mass % to less than or equal to about 45 mass % of the total mass of the cementitious composite material composition, the aggregate is present at greater than or equal to about 18 mass % to less than or equal to about 35 mass % of the total mass of the composition, water is present at greater than or equal to about 18 mass % to less than or equal to about 30 mass % of the total mass of the composition, and the polymeric fiber is present at greater than or equal to about 0.7 mass % to less than or equal to about 2.1 mass % of the total mass of the cementitious composite material. As noted above, the fly ash may include a Type F fly ash, a Type C fly ash, or both.

In yet other variations, the cementitious composite material may be free of Portland cement. Such a Portland cement-free cementitious composite material may comprise one or more fly ashes, such as a Type C and/or Type F fly ash. In certain variations, the total fly ash is present at greater than or equal to about 60 mass % to less than or equal to about 70 mass % of the total mass of the cementitious composite material composition, the Class C fly ash is present at greater than or equal to about 50 mass % to less than or equal to about 55 mass % of the total mass of the composition, the aggregate is present at greater than or equal to about 20 mass % to less than or equal to about 25 mass % of the total mass of the composition, water is present at greater than or equal to about 15 mass % to less than or equal to about 20 mass % of the total mass of the composition, and the polymeric fiber is present at greater than or equal to about 1 volume % to less than or equal to about 2 volume % of the total volume of the cementitious composite material.

Thus, the present disclosure provides a novel class of low-energy ductile cementitious composites combined with a tailorable $CO_2$-absorbing process ($CO_2$-ECC) that utilizes $CO_2$ and transforms it to solid minerals for use in constructing infrastructure. For example, such infrastructure components can provide a more efficient, durable and sustainable precast concrete industry. In certain aspects, advantages of the present teachings include (1) expediting the process of tensile strength and ductility development by involving $CO_2$ in the hydration and micromechanical mechanisms of cementitious materials. For example, tensile strength is accelerated to achieve 4.5 MPa value by 2 days in comparison to 4-7 days with a conventional concrete, and (2) enhancing material durability of the cementitious composite material by precipitating chemically stable carbonate minerals from gaseous $CO_2$ and reducing microcrack width to below 50 μm to promote self-healing ability, which can be further reduced after the carbon dioxide curing/carbonation process. A pre-conditioning process conducted in accordance with various aspects of the present disclosure before $CO_2$ treatment can be used to tailor $CO_2$ sequestration in different composite systems. This conditioning process can be used on both (1) Portland cement-based ductile composites, and (2) a Portland cement-free binary ductile composites.

In certain aspects, the cementitious composite material can provide materials with ultrahigh tensile strain capacity and autogenously tight crack widths through fiber bridging technologies, as well as substantially enhanced material longevity through self-healing. With the tailored manufacturing process including the above-described in-mold and post-mold conditioning steps, the cast cementitious structure capable of a carbon dioxide uptake level of greater than or equal to about 6% by weight of binder, for example, of Class C fly ash in a cementitious composite material free of Portland cement. In other variations, as described previously above, the cast cementitious structure comprising Portland cement may be capable of a carbon dioxide uptake level of greater than or equal to about 35% by weight carbon dioxide ($CO_2$). Furthermore, after carbonation, the cast cementitious structure can achieve greater than or equal to about 2% tensile strain and crack widths of less than about 100 μm, optionally less than or equal to about 75 μm, and optionally less than or equal to about 50 μm, without compromising tensile or compressive strength.

As noted above, the tailorable $CO_2$-absorbing process methods of the present teachings include three aspects, (1) early demolding as compared to conventional molding processes (first conditioning process 30 followed by demolding step 34), (2) optimized water removal (post-mold drying process 36 of second conditioning 32), and (3) optimized $CO_2$ exposure (carbonation process 38) in certain variations. By tailoring these three steps, the curing process can be adapted to different binder systems and mix proportions.

For example, with respect to early demolding (e.g., demolding step 34) as compared to conventional casting of concrete products, this process can be highly dependent on setting time and water content of the mixture. Specifically, mixtures are demolded after initial set to ensure adequate mechanical integrity to prevent material loss. The demolding operation 34 is earlier than the hydration age when a limited amount of free water is available to be removed in the water removal step. To avoid this scenario, the demolding time for demolding 34 can be tailored based on empirical observation or mix proportions can be tailored with inclusion of additional free water and a setting agent, such as accelerating admixture or calcium aluminate cement. Generally, fast setting can be achieved by accelerating the cement hydration process, or by tailoring cement chemistry to include fast hydrating phases, such as calcium aluminate phases.

The water removal process in post-mold drying 36 can be tailored to the optimal level, where either higher or lower water removal percentage can reduce efficiency of $CO_2$ carbonation, as described herein. This is determined by the mixture type and length of the first process of demolding. By way of example, ranges of water removal percentages and amount of carbon dioxide uptake are provided in Table 2 below.

TABLE 2

| Water removal range (% of initial water removed during de-molded dehydration) | Mass gained during carbonation | Estimated $CO_2$ uptake |
|---|---|---|
| 0-10% | 0% | <5% |
| 10-20% | 1.5-5.3% | 6-18% |
| 20-30% | 5.3-8.2% | 18-28% |
| 30-40% | 8.2-10.2% | 28-35% |
| 40-50% | 5.8-8.8% | 20-30% |
| 50-60% | <5.8% | <20% |

It should be noted that removing more than 60% of the initial mixing water is difficult and will take a long time to conduct the second conditioning process 32, including the post-mold drying process 36 or dehydration step. Thus, while removing more water above these levels is feasible, it consumes more energy and delays production turnover, hence making $CO_2$ curing conducted in accordance with certain aspects of the present disclosure potentially less appealing as compared to traditional steam curing for precast ECC manufacture.

In certain aspects, greater than or equal to about 10% to less than or equal to about 60% by weight of an initial amount of water present in the cementitious composite material is removed from the cementitious composite material after the drying, optionally greater than or equal to about 15% to less than or equal to about 50% by weight, optionally greater than or equal to about 20% to less than or equal to about 40% by weight, optionally greater than or equal to about 30% to less than or equal to about 40% by weight of an initial amount of water present in the cementitious composite material is removed from the cementitious composite material after the drying.

Finally, a total length or duration of the first conditioning process 30 and second conditioning process 32 can be controlled to ensure the post-carbonation (post-carbonation process 38) long-term development of mechanical integrity. The exposure to carbon dioxide can be optimized through engineering the $CO_2$ gas condition (temperature/relative humidity/partial pressure). Further, the composite material mixture and treatment in the first two conditioning steps (30, 32) can be redesigned and modified, so that the optimal timings and conditions of the three-module $CO_2$-absorbing process (first conditioning process 30, second conditioning process 32, and carbonation process 38) can be substantially different among different binder compositions, particularly for the Portland cement-free versus Portland cement-containing based binder composite systems. Details of representative cementitious composite compositions are provided in the examples section below.

The cast cementitious structures formed with the conditioning methods of the present disclosure will help to abate $CO_2$ emissions of the construction industry, while significantly improving manufacturing efficiencies and durability of precast building products. These cementitious composite materials also promote sustainable development of the coal-power industry. High tensile ductility of the cast cementitious structures allows elimination of steel reinforcement in the concrete and poses no limits on the $CO_2$ alteration. Further, the cementitious composite material can also be used with 3D printing or additive manufacturing applications, by using carbon dioxide ($CO_2$) as a fast setting agent when the cementitious composite mixture ink is printed, or by creating high geometric surface areas for maximizing the diffusion path for $CO_2$ mineralization. ECC cementitious composite materials suitable for use in additive manufacturing or 3D printing are described in International Publication No. WO 2019/089771 entitled "Self-Reinforced Cementitious Composite Compositions for Building-Scale Three Dimensional (3D) Printing," the relevant portions of which are incorporate herein by reference.

The present technology can be applied to the manufacturing of general precast structural products for various infrastructure systems. For example, it is particularly advantageous in areas with close proximity to $CO_2$ point sources, for example, coal power plants or cement manufacturers, where large quantities of waste $CO_2$ gas are easily available with minimal transportation or capture costs. The cast cementitious composite materials can be used for a variety of structural and non-structural applications, for example, block and slab, and infrastructures exposed to extreme environments, because these materials demonstrate superior resistance to chemical and physical deterioration due to durable chemistry and high ductility, as well as possessing self-healing capabilities that address long-term material resiliency.

In certain aspects, the present disclosure substantially reduces a net carbon dioxide ($CO_2$) footprint of building and infrastructure materials by utilizing waste carbon dioxide ($CO_2$) for carbonation. Further, a scalable and bendable composite structure formed with waste $CO_2$ gas and waste coal combustion ashes can be formed with value-added ingredients. Further, in certain aspects, $CO_2$ is utilized to expedite early-age physiochemical reactions and development of tensile strength and ductility to achieve rapid precast manufacturing and turnover. Thus, the cast cementitious composite materials prepared in accordance with certain aspects of the present disclosure enhance infrastructure durability and provide damage tolerant and self-healing structures.

Unlike conventional systems, the binder systems (both Portland cement-based and Portland cement-free) provided in certain aspects of the present disclosure are essentially hydraulic and do not rely on the $CO_2$ treatment to form tensile strength or ductility. The role of the optional $CO_2$ treatment is to accelerate the development of mechanical integrity and enhance durability in the long term. The sequestered $CO_2$ also densifies microstructure and reduces crack width at material surfaces within the cementitious composite materials, while the high tensile ductility can reduce the need for steel reinforcement in certain structural applications. These features can lead to less permeable and more durable cementitious materials during the service life.

Various embodiments of the inventive technology can be further understood by the specific examples contained herein. Specific Examples are provided for non-limiting illustrative purposes of how to make and use the compositions, devices, and methods according to the present teachings.

Example 1

Figure 2:
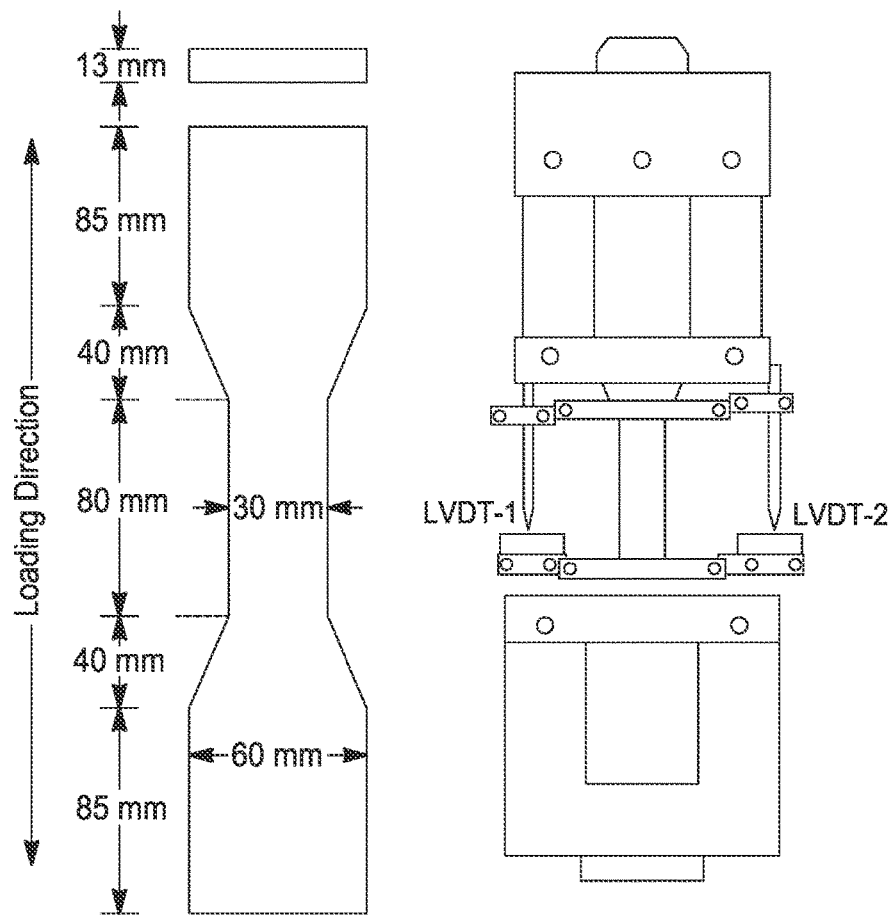

$CO_2$ sequestration capacity and performance evaluation. Composite $CO_2$ sequestration capacity can be evaluated through thermogravimetric analysis (TGA). The composite mass gain during the $CO_2$ treatment can be measured to examine the rate of $CO_2$ carbonation. The carbonated composites are tested under uniaxial tension, using the setup shown in FIG. 2. The dimensions and apparatus of a dogbone-shaped specimen for uniaxial tension testing are shown, with a loading direction indicated. The result of $CO_2$ uptake and tensile strain capacity can help inform routes of material formulation and $CO_2$ processing, through tailoring proportions of the ingredients and $CO_2$ treatment conditions.

Example of Portland Cement (PC)-Based Ductile Composite $CO_2$ sequestration in a PC-based ductile composite is demonstrated. Table 3 lists material formulations of two PC-based ductile composites, based on binary blends of PC and a siliceous coal ash. The formulations include: Type I Portland cement commercially available from LafargeHolcim, Class F fly ash commercially available from Headwaters Inc., F-75 Silica sand commercially available from U.S. Silica, ADVA 195 HRWR sold by GCP Technologies, and Recs-15 PVA fiber sold by Nycon Corporation.

TABLE 3

Material formulations of PC-based composite (mass ratio).

| Mix | PC | Siliceous coal ash | Sand | Water | HRWR | PVA fiber, % vol. |
|---|---|---|---|---|---|---|
| 1 | 1 | 1.2 | 0.80 | 0.58 | 0.007 | 2 |
| 2 | 1 | 2.2 | 1.16 | 0.79 | 0.013 | 2 |

Figure 3:
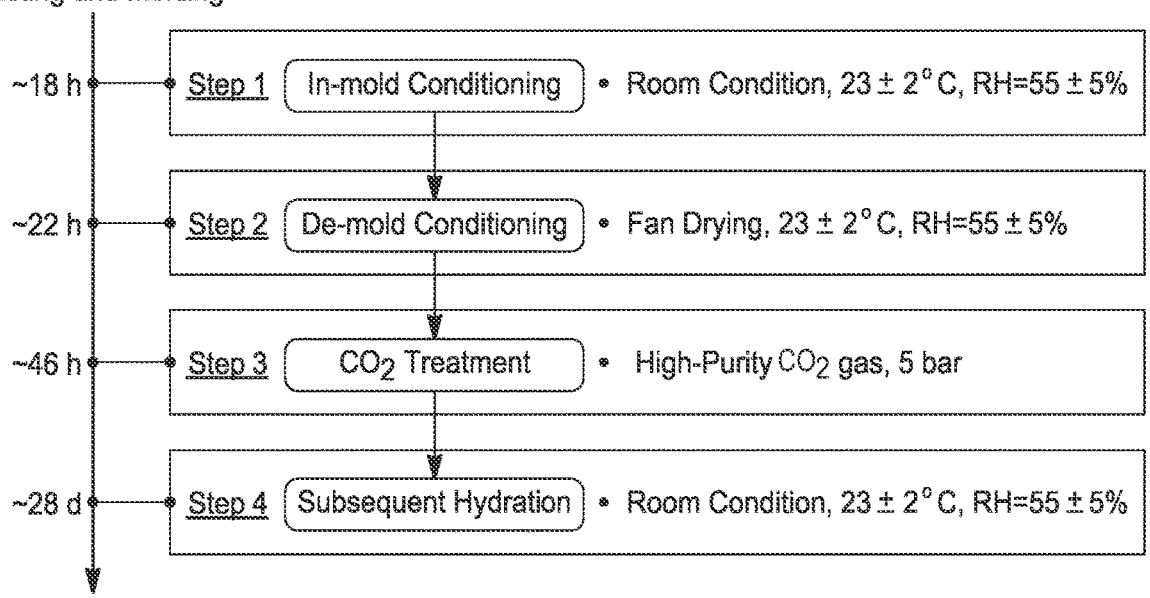

Fresh cementitious composite mixtures are cast to dogbone-shaped specimens and treated with a 4-step process. FIG. 3 shows an optimized timeframe and condition for each step for this example. The treatment is detailed below.

In Step 1: In-mold conditioning is designed to achieve sufficient early strength for demolding. The fresh cementitious composite mixture in the mold is trowel-finished along the surface and exposed to room conditions at a temperature of 23±2° C. and relative humidity of 55±5% for 18 hours.

In Step 2: Specimens are demolded and transferred to the step of de-mold conditioning, namely drying. The de-mold conditioning creates an optimal condition in cementitious composites for a carbonation reaction. A fan drying method is applied to remove excess free water in microporous spaces of the cementitious composite material and to facilitate diffusion of $CO_2$ gas in the subsequent carbonation process. Approximately 4-hours of fan drying is effective to achieve a desirable carbonation efficiency.

In Step 3: The carbonation process/$CO_2$ treatment is performed with high-purity $CO_2$ gas (>98% $CO_2$ concentration) at a pressure of 5 bar for 24 hours.

In Step 4: Post-carbonation hydration of cement is enabled through the remaining free water in the $CO_2$-treated composites. In other words, no additional hydration treatment beyond relative humidity present in the surrounding atmosphere is employed in this example. Specimens are kept at ambient/room conditions for 28 days before the performance evaluation.

Turn-over time is an important aspect of precast manufacturing. A short production period reduces occupancy of equipment and improves economic efficiency. In this regard, it is desirable to limit a maximum duration of to less than or equal to about 48 hours to complete Steps 1-3 including operating time, e.g., demolding and specimen mounting time. In parallel, a non-carbonated reference is demolded at 18 hours and was kept at room condition awaiting designated testing ages.

Figure 4:
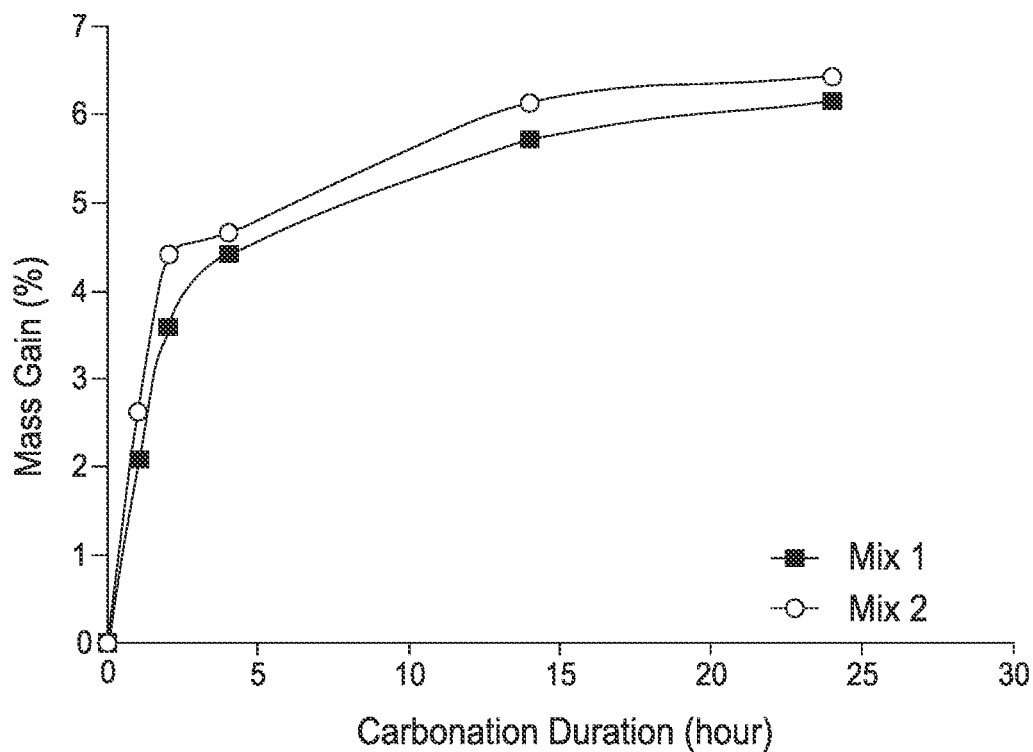
FIG. 4 is a graph showing mass gain (%) versus carbonation duration (hour) for an example prepared in accordance with certain aspects of the present disclosure.
Figure 5:
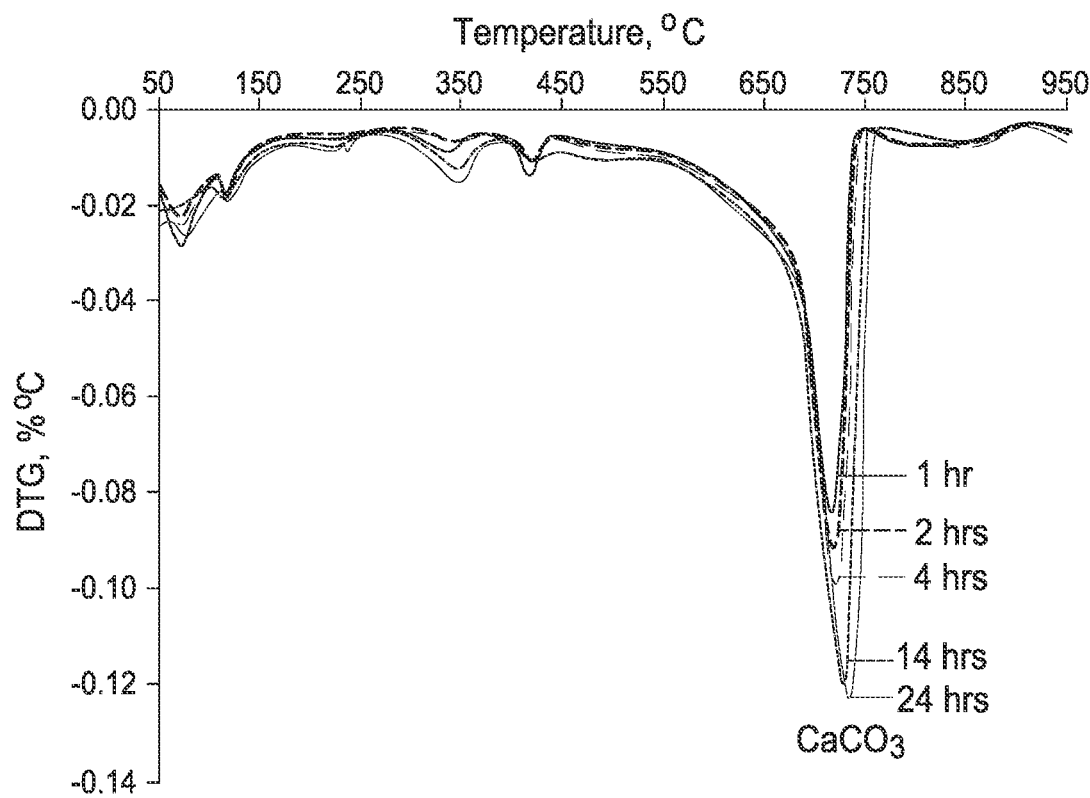
FIG. 5 is a graph showing differential mass loss curves showing $CaCO_3$ intensity versus carbonation duration for an example prepared in accordance with certain aspects of the present disclosure.

In Step 3, the effect of carbonation duration on $CO_2$ uptake is examined. FIG. 4 plots the specimen's mass gain as a function of carbonation duration. Due to water evaporation led by the heat of reaction, the composite mass gain during $CO_2$ treatment is not equivalent to the actual $CO_2$ uptake. However, the mass gain can be used to reflect the kinetics and intensities of the carbonation reaction. The differential mass loss curves obtained by TGA are shown in FIG. 5. More specifically, FIG. 5 shows differential mass loss curves showing $CaCO_3$ intensity versus carbonation duration for Mix 1. After 24-hour $CO_2$ treatment, the $CO_2$ uptake could achieve approximately 35% by PC mass.

Figure 6A:
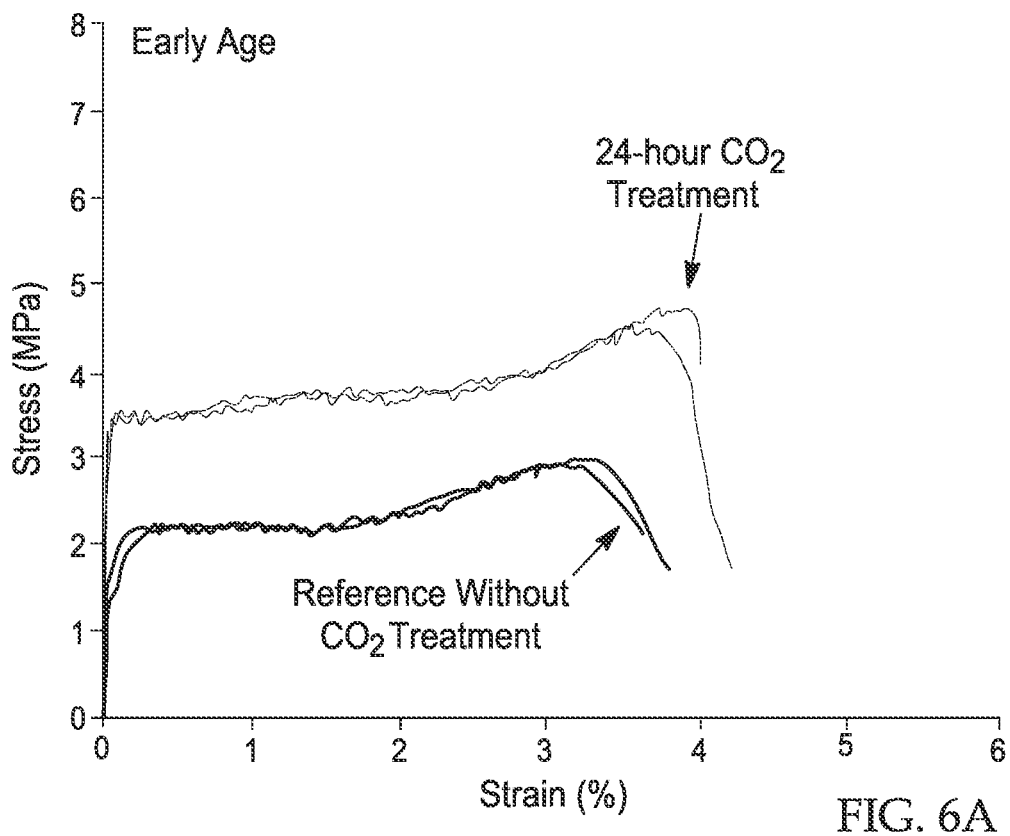
FIGS. 6A-6B are uniaxial tensile stress-strain curves of PC-based ductile composites with $CO_2$ sequestration prepared in accordance with certain aspects of the present disclosure at early age (FIG. 6A) and after 28 days (FIG. 6B)
Figure 6B:
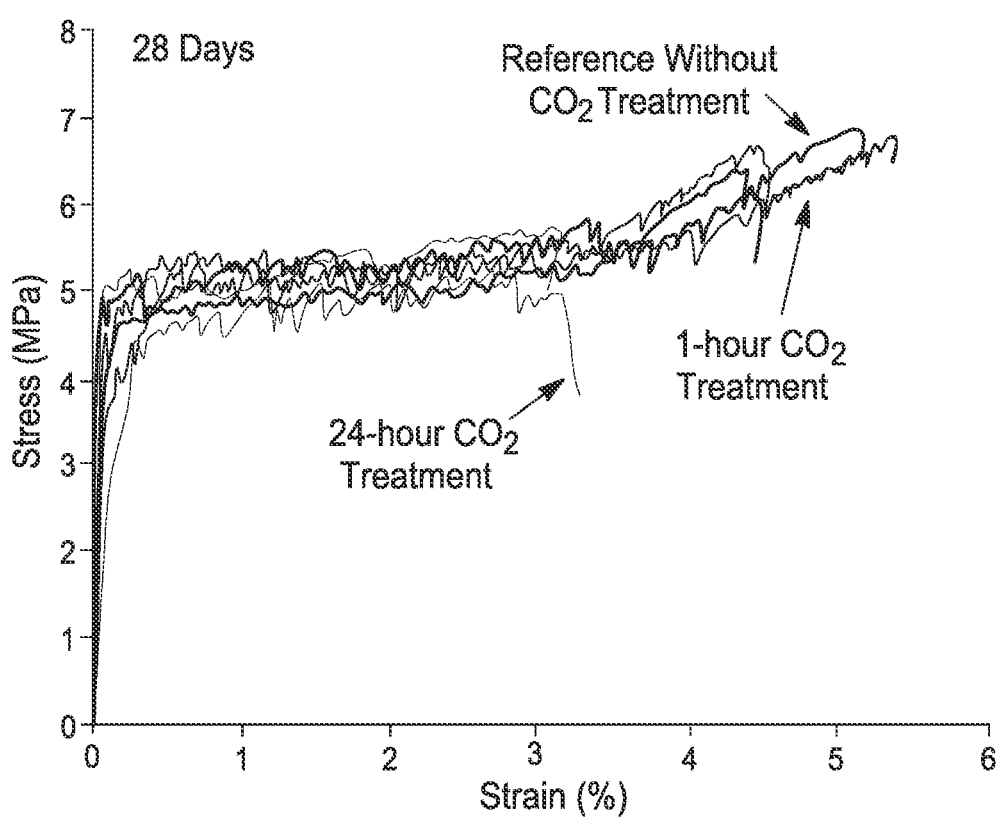

Tensile strength and strain capacity are evaluated for the $CO_2$-treated composites, both immediately after Step 3 and at 28 days. FIGS. 6A-6B show stress-strain curves obtained from uniaxial tension test. More specifically, uniaxial tensile stress-strain curves of PC-based ductile composites with $CO_2$ sequestration are shown for FIG. 6A of early age carbonated cementitious composite material, and FIG. 6B shows 28 days aged carbonated cementitious composite material. Four repetitions are tested with two typical ones selected for comparison. Through the uniaxial tension tests, it is found that the 24-hour $CO_2$ treatment effectively accelerated the early development of composite tensile strength and strain capacity. At 28 days, the composite tensile strain capacity decreases if with the 24-hour $CO_2$ treatment, but appears comparable to the reference if the $CO_2$ treatment is limited to 1 hour.

FIGS. 7A-7D show uniaxial tension test results of multiple re-design routes for improving composite tensile ductility with the 24-hour $CO_2$ treatment. More specifically, uniaxial tensile stress-strain curves of PC-based ductile composites at 28 days are shown for: (FIG. 7A) 1% vol. Polypropylene beads in the cementitious composite material, (FIG. 7B) surface-modified fibers in the cementitious composite material, (FIG. 7C) high volume siliceous ash in the cementitious composite material, and (FIG. 7D) 10% MgO mineral additive in the cementitious composite material.

Figure 7A:
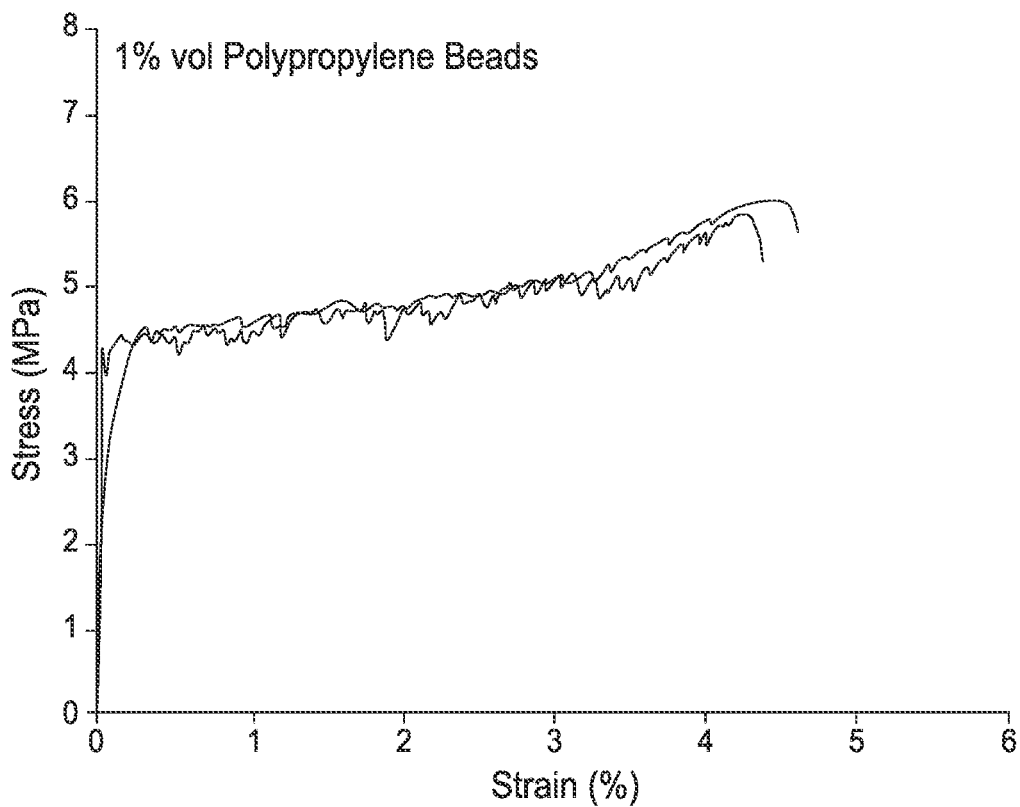
Figure 7B:
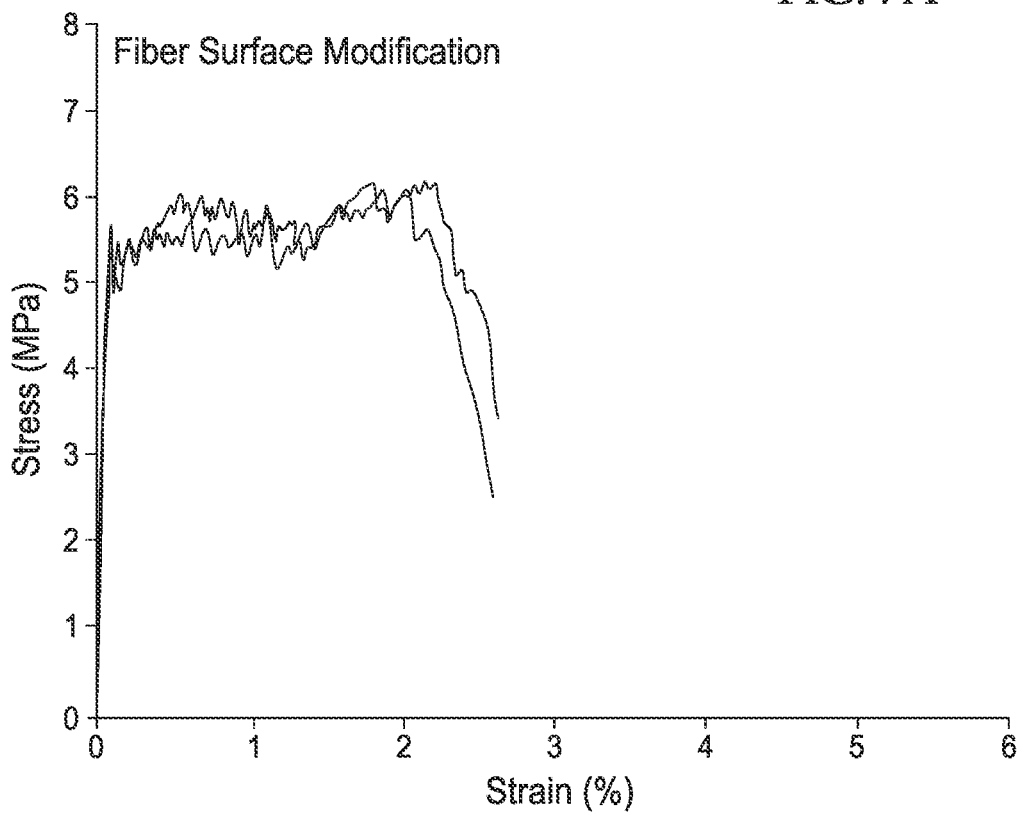
Figure 7C:
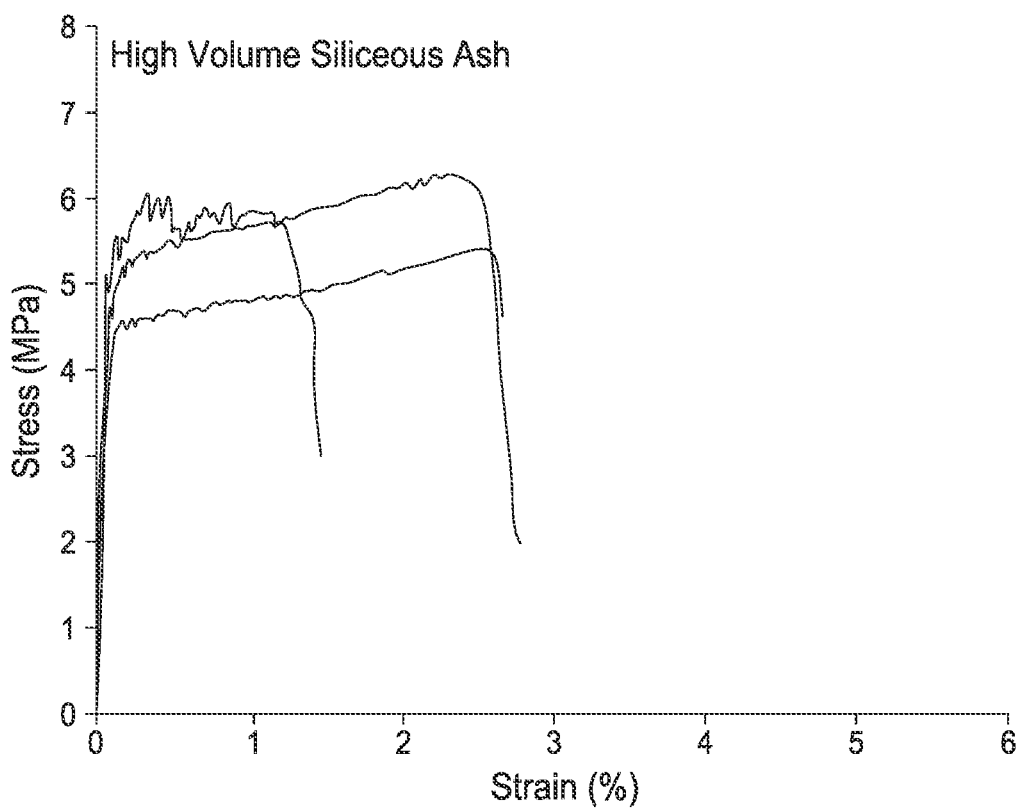
Figure 7D:
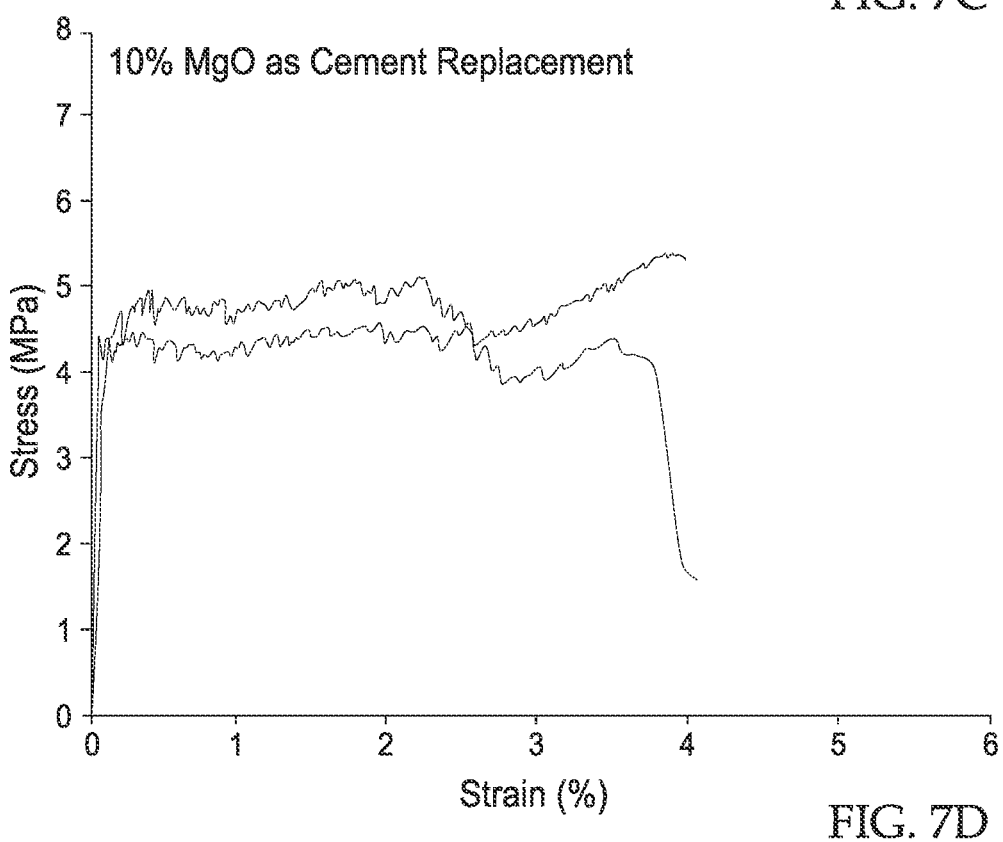

Two pathways are followed: (1) modifying the matrix of the cementitious composite material, as shown in FIGS. 7A, 7C-7D, and (2) modifying a fiber surface, as shown in FIG. 7B. Incorporating polypropylene beads at 1% vol. is found to be most effective and restores tensile ductility to above 4% (FIG. 7A). Strain-hardening character is also identified.

Example 2

In Example 2, a Portland cement free (PC-Free) Ductile Composite Material is explored. The development of a PC-free ductile composite is based on two different types of coal ashes for $CO_2$ sequestration. The composite binder system is built on a calcareous coal ash and does not rely on Portland cement (PC). Therefore, the composite embodies a low carbon footprint for its raw materials, and has the potential of achieving carbon neutrality as it is combined with $CO_2$ sequestration. For the material formulating procedure, experimental trials are conducted as shown in Table 4. Eight composite formulations are analyzed, covering different mix proportion and fiber surface coating contents.

TABLE 4

Experimental trials for PC-free ductile composite based on two coal ashes.

| No. | A4 | A6/A4 ratio[1] | w/A4 ratio[2] | sand/A4 ratio | fiber coating[3] | Observation of tension tests after $CO_2$ treatment |
|---|---|---|---|---|---|---|
| 1 | 1 | 2.2 | 0.4 | 0.8 | 1.2% | strength <1 MPa, max strain <1% |
| 2 | 1 | 1.2 | 0.4 | 0.8 | 1.2% | strength <1 MPa, max strain <1% |
| 3 | 1 | 0.2 | 0.4 | 0.4 | 1.2% | strength ~1.7 MPa, max strain ~1% |
| 4 | 1 | 0.2 | 0.4 | 0.4 | 0.5% | strength ~1.7 MPa, max strain ~3% |
| 5 | 1 | 0.2 | 0.4 | 0.4 | 0.3% | strength ~1.4 MPa, max strain ~2% |
| 6 | 1 | 0.2 | 0.3 | 0.4 | 1.2% | strength ~2.0 MPa, max strain ~4.5% |
| 7 | 1 | 0.2 | 0.3 | 0.4 | 0.5% | strength ~2.0 MPa, max strain ~4.0% |
| 8 | 1 | 0.2 | 0.3 | 0.4 | 0.3% | strength ~2.0 MPa, max strain ~3.5% |

All ratios are based on mass.
[1]A6 and A4 are two types of coal ashes; A6 is a siliceous ash commonly used in concrete, A4 is a calcareous ash reactive to $CO_2$;
[2]mass ratio of water to A4;
[3]PVA fiber is used at a constant volume of 2%.

FIG. 8 shows a timeframe for sequestering $CO_2$ in the PC-free ductile cementitious composite material. Unlike the PC-based composites, the pre-carbonation hydration age (Steps 1 and 2) can be shortened to 6-9 hours. The $CO_2$ treatment is applied for 24 hours using high-purity $CO_2$ gas at a relatively low pressure (2 bar). The composite tensile performance is evaluated after subsequent hydration at the age of 28 days.

Based on the selections of composite formulations shown in Table 4, four mixes are selected for performance evaluation at 28 days. Table 5 shows the mix proportions adopted for 28-day tension experiment.

TABLE 5

Mix proportions of PC-free ductile composite based on binary blends (mass ratio).

| No. | A4 | A6 | Silica Sand | MgO | Water | PVA fiber, vol. |
|---|---|---|---|---|---|---|
| #1 | 1 | 0.2 | 0.6 | 0 | 0.30 | 2% |
| #2 | 1 | 0.2 | 0.4 | 0 | 0.30 | 2% |
| #3 | 1 | 0.2 | 0.6 | 0.1 | 0.33 | 2% |
| #4 | 1 | 0.2 | 0.4 | 0.1 | 0.33 | 2% |

Results of uniaxial tension experiment at 28 days are shown in FIGS. 9A-9D. More specifically, uniaxial tensile stress-strain curves of PC-free ductile composites made with (FIG. 9A) Mix #1, (FIG. 9B) Mix #2, (FIG. 9C) Mix #3, and (FIG. 9D) Mix #4.

The composite material generally achieves strain capacities of up to 4.0% at 28 days after the $CO_2$ treatment. In certain aspect, an optimal mix proportion, here Mix #1, attains a $CO_2$ uptake of ~7% based on the mass of A4. Modifying the composite formulation by incorporating MgO mineral additives in Mixes #3 and #4 can further improve the $CO_2$ sequestration potential up to 10% by the mass of A4, with the tensile strain capacity maintained at over 2%.

Example 3

Example 3 further explores the effect of water removal on $CO_2$ uptake.

In fresh mixtures of the cementitious composite materials, pore water impedes diffusion path of $CO_2$ gas and hinders the $CO_2$ uptake process. On the other hand, water is a critical participant of the carbonation process. The gaseous $CO_2$ dissolves in water and binds $Ca^{2+}$ ions dissolved from calcium silicates. Therefore, water content in cementitious composites is tailored in accordance with various aspects of the present disclosure to achieve the optimal $CO_2$ sequestration capacity. Here, three experimental trials with different pre-treatments and $CO_2$ exposure conditions are provided. The $CO_2$ sequestration capacities are tabulated in Table 6.

Example 3A. No pre-treatment before $CO_2$ exposure. The cementitious composite material mix design (mass unless otherwise noted): Type I Portland cement:fly ash:silica sand:water=1:1.2:0.8:0.58, PVA fiber volume=2%. The mixing protocol is as follows. (1) 3 minutes of mixing of Portland cement, fly ash and silica sand, (2) an additional 2 minutes of mixing with water, (3) 4 minutes of mixing with PVA fiber. The cementitious composite material mix of Example 3A is placed in a mold. The demolding time occurs 18 hours after casting and molding. Specimens are sealed using a plastic membrane.

For Example 3A, no pre-treatment is conducted before $CO_2$ exposure. Specimens are demolded and immediately moved into a carbonation chamber. The chamber is filled with 5 atm $CO_2$ gas at room temperature. Specimens are exposed to $CO_2$ gas for 24 hours.

Results and observations: specimen mass change was within ±0.1% during 24 hours. Phenolphthalein is used as a pH indicator to show the depth of carbonation on specimen cross sections. All sections turned to red for Example 3A, indicating no carbonation is achieved.

Example 3B has no pre-treatment before $CO_2$ exposure, but has different $CO_2$ exposure conditions.

The mix design and mixing protocol are the same as detailed above for Example 3A. Upon casting and molding, specimens are sealed until demolding at 18 hours.

$CO_2$ exposure: two different $CO_2$ exposure conditions are applied: (1) $CO_2$ gas heated to 50° C., with a pressure up to 50 atm, and (2) $CO_2$ gas at room temperature and 5 atm pressure, silica gel is placed at bottom of the chamber as a desiccant. Carbonation time is 24 hours for both conditions.

Results and observations: In Case (1), specimen mass increases by 0.3%, whereas in Case (2), specimen mass increases by 0.5%. The depth of carbonation was 0 for Case (1) and lower than 1 mm for Case (2), as suggested by phenolphthalein indicator.

Example 3C: With Conditioning by Water Removal Before $CO_2$ Exposure

The mix design and mixing protocol are the same as Examples 3A-3B. Specimens are demolded at 18 hours after molding, and are set up for fan drying for 4 hours. Specimens are weighted before and after the drying process, and the mass change is used for determining the extent of water removal according to Eq. 1.

Water removal=Specimen mass decrease during drying process/Initially mixed water    (Eq. 1).

The initially mixed water can be determined based on the composite mix proportion and the specimen mass before drying. Table 6 lists the extent of water removal and the corresponding mass gain led by $CO_2$ exposure.

TABLE 6

Summary of experimental trials regarding water removal

| Water removal | Mass gain during carbonation | Estimated $CO_2$ uptake |
|---|---|---|
| 0% | 0% | 0% |
| 2.1% | 0.5% | >1.8% |
| 18.9% | 4.7% | >16.2% |
| 25.7% | 7.3% | >25.0% |
| 44.3% | 6.6% | >21.9% |

As can be seen, with little or no water removal (0 or 2.1%), the estimated $CO_2$ uptake is negligible, at 0% and 1.8%. However, where the water removal is increased to about 18.9%, the estimated carbon dioxide uptake increases significantly to greater than about 16.2% and greater amounts result in significant capability for carbon dioxide uptake.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing a cementitious structure for carbon dioxide sequestration, the method comprising:
    conditioning a cementitious composite material comprising a binder and water by exposing the cementitious composite material to greater than or equal to about 50% relative humidity to less than or equal to about 80% relative humidity at a temperature of less than or equal to about 25° C. for a duration of greater than or equal to about 3 hours to less than or equal to about 4 hours, wherein the binder comprises a Type C fly ash and a Type F fly ash, wherein the Type C fly ash and the Type F fly ash are cumulatively present at greater than or equal to about 60% by weight of the cementitious composite material and the cementitious composite material is free of Portland cement; and
    drying the cementitious composite material to remove at least greater than or equal to about 20% by weight of initial water in the cementitious composite material to form the cementitious structure capable of a carbon dioxide ($CO_2$) uptake level of greater than or equal to about 6% by weight binder, wherein the cementitious structure has a tensile strain capacity of greater than or equal to about 1% and a uniaxial tensile strength of greater than or equal to about 1 MPa.

2. The method of claim 1, further comprising carbonating the cementitious structure after the drying.

3. The method of claim 2, further comprising exposing the cast cementitious structure to water for rehydration after the carbonating.

4. The method of claim 1, wherein the conditioning occurs at ambient temperatures and the temperature is greater than or equal to about 21°° C. to less than or equal to about 25° C.

5. The method of claim 1, wherein greater than or equal to about 20% to less than or equal to about 40% of an initial amount of water present in the cementitious composite material is removed from the cementitious composite material after the drying.

6. The method of claim 1, wherein greater than or equal to about 20% to less than or equal to about 60% of an initial amount of water present in the cementitious composite material is removed from the cementitious composite material after the drying.

7. The method of claim 1, wherein the cementitious composite material further comprises at least one aggregate and at least one polymeric fiber.

8. The method of claim 1, wherein the drying is conducted for greater than or equal to about 2 hours to less than or equal to 6 hours.

9. The method of claim 1, wherein the tensile strain capacity is greater than or equal to about 2% and the uniaxial tensile strength is greater than or equal to about 2 MPa.

* * * * *